United States Patent
Ingersoll et al.

(10) Patent No.: US 8,522,538 B2
(45) Date of Patent: Sep. 3, 2013

(54) SYSTEMS AND METHODS FOR COMPRESSING AND/OR EXPANDING A GAS UTILIZING A BI-DIRECTIONAL PISTON AND HYDRAULIC ACTUATOR

(75) Inventors: Eric D. Ingersoll, Cambridge, MA (US); Justin A. Aborn, Hingham, MA (US); Matthew Blieske, Francestown, NH (US)

(73) Assignee: General Compression, Inc., Newton, MA (US)

( * ) Notice: Subject to any disclaimer, the term of this patent is extended or adjusted under 35 U.S.C. 154(b) by 0 days.

(21) Appl. No.: 13/294,675

(22) Filed: Nov. 11, 2011

(65) Prior Publication Data

US 2012/0096845 A1   Apr. 26, 2012

(51) Int. Cl.
*F16D 31/02*   (2006.01)
*F04B 25/00*   (2006.01)

(52) U.S. Cl.
USPC ............... 60/371; 60/408; 60/409; 417/267

(58) Field of Classification Search
USPC .................. 60/407, 408, 409, 370, 371, 398; 417/267
See application file for complete search history.

(56) References Cited

U.S. PATENT DOCUMENTS

| | | | |
|---|---|---|---|
| 114,297 A | 5/1871 | Ivens et al. | |
| 224,081 A | 2/1880 | Eckart | |
| 233,432 A | 10/1880 | Pitchford | |
| 320,482 A | 6/1885 | Leavitt | |
| 874,140 A | 12/1907 | Valiquet | |
| 943,000 A | 12/1909 | Busby | |
| 1,045,961 A | 12/1912 | Ferranti | |
| 1,147,204 A | 7/1915 | Anheuser | |
| 1,230,028 A | 6/1917 | Rardon | |
| 1,353,216 A | 9/1920 | Carlson | |
| 1,369,596 A | 2/1921 | Yanacopoulos | |
| 1,635,524 A | 7/1927 | Aikman | |
| 1,681,280 A | 8/1928 | Earll | |

(Continued)

FOREIGN PATENT DOCUMENTS

| GB | 1249992 A | 10/1971 |
|---|---|---|
| GB | 2013318 | 8/1979 |

(Continued)

OTHER PUBLICATIONS

First Action Interview Pilot Program Pre-Interview Communication for U.S. Appl. No. 12/977,724, mailed Oct. 28, 2011.

(Continued)

*Primary Examiner* — Edward Look
*Assistant Examiner* — Logan Kraft
(74) *Attorney, Agent, or Firm* — Goodwin Procter LLP

(57) ABSTRACT

Systems, methods and devices for optimizing bi-directional piston movement within a device or system used to compress and/or expand a gas, such as air, are described herein. In some embodiments, a compressed air device and/or system can include a first pneumatic cylinder, a second pneumatic cylinder, a hydraulic actuator, and a hydraulic controller. The first pneumatic cylinder has a first working piston disposed therein for reciprocating movement in the first pneumatic cylinder and the hydraulic actuator is coupled to the first working piston. The second pneumatic cylinder has a second working piston disposed therein for reciprocating movement in the second pneumatic cylinder. The hydraulic controller is fluidically coupleable to the hydraulic actuator and is operable in a compression mode and an expansion mode.

17 Claims, 15 Drawing Sheets

(56) References Cited

U.S. PATENT DOCUMENTS

| | | |
|---|---|---|
| 1,918,789 A | 7/1933 | Ttisworth |
| 1,947,304 A | 2/1934 | Morro |
| 2,025,142 A | 12/1935 | Zahm et al. |
| 2,042,991 A | 6/1936 | Harris, Jr. |
| 2,141,703 A | 12/1938 | Bays |
| 2,150,122 A | 3/1939 | Kollberg et al. |
| 2,280,100 A | 4/1942 | Singleton |
| 2,280,845 A | 4/1942 | Parker |
| 2,339,086 A | 8/1944 | Makaroff |
| 2,404,660 A | 7/1946 | Rouleau |
| 2,420,098 A | 5/1947 | Rouleau |
| 2,454,058 A | 11/1948 | Hays |
| 2,479,856 A | 8/1949 | Mitton |
| 2,539,862 A | 1/1951 | Rushing |
| 2,628,564 A | 2/1953 | Jacobs |
| 2,683,964 A | 7/1954 | Anxionnaz et al. |
| 2,706,077 A | 4/1955 | Searcy |
| 2,712,728 A | 7/1955 | Lewis et al. |
| 2,813,398 A | 11/1957 | Wilcox |
| 2,824,687 A | 2/1958 | Osterkamp |
| 2,829,501 A | 4/1958 | Walls |
| 2,880,759 A | 4/1959 | Wisman |
| 2,898,183 A | 8/1959 | Fauser |
| 3,014,639 A | 12/1961 | Boli |
| 3,041,842 A | 7/1962 | Heinecke |
| 3,232,524 A | 2/1966 | Rice at al. |
| 3,236,512 A | 2/1966 | Caslav et al. |
| 3,269,121 A | 8/1966 | Ludwig |
| 3,355,096 A | 11/1967 | Hornschuch |
| 3,523,192 A | 8/1970 | Lang |
| 3,530,681 A | 9/1970 | Dehne |
| 3,538,340 A | 11/1970 | Lang |
| 3,608,311 A | 9/1971 | Roesel, Jr. |
| 3,618,470 A | 11/1971 | Mueller et al. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | Rigollot |
| 3,792,643 A | 2/1974 | Scheafer |
| 3,793,848 A | 2/1974 | Eskeli |
| 3,796,044 A | 3/1974 | Schwarz |
| 3,801,793 A | 4/1974 | Goebel |
| 3,802,795 A | 4/1974 | Nyeste |
| 3,803,847 A | 4/1974 | McAlister |
| 3,806,733 A | 4/1974 | Haanen |
| 3,818,801 A | 6/1974 | Kime |
| 3,825,122 A | 7/1974 | Taylor |
| 3,832,851 A | 9/1974 | Kiernan |
| 3,835,918 A | 9/1974 | Pilarczyk |
| 3,839,863 A | 10/1974 | Frazier |
| 3,847,182 A | 11/1974 | Greer |
| 3,854,301 A | 12/1974 | Cytryn |
| 3,895,493 A | 7/1975 | Rigollot |
| 3,903,696 A | 9/1975 | Carman |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,968,732 A | 7/1976 | Fitzgerald |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | Herberg |
| 3,998,049 A | 12/1976 | McKinley et al. |
| 4,008,006 A | 2/1977 | Bea |
| 4,009,587 A | 3/1977 | Robinson, Jr. et al. |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,053,395 A | 10/1977 | Switzgable |
| 4,055,950 A | 11/1977 | Grossman |
| 4,058,979 A | 11/1977 | Germain |
| 4,079,586 A | 3/1978 | Kincaid, Jr. |
| 4,079,591 A | 3/1978 | Derby |
| 4,089,744 A | 5/1978 | Cahn |
| 4,090,940 A | 5/1978 | Switzgable |
| 4,095,118 A | 6/1978 | Rathbun |
| 4,100,745 A | 7/1978 | Gyarmathy et al. |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,343 A | 9/1978 | Hoffeins |
| 4,117,696 A | 10/1978 | Fawcett et al. |
| 4,118,637 A | 10/1978 | Tackett |
| 4,124,182 A | 11/1978 | Loeb |
| 4,124,805 A | 11/1978 | Jacoby |
| 4,126,000 A | 11/1978 | Funk |
| 4,136,432 A | 1/1979 | Melley, Jr. |
| 4,137,015 A | 1/1979 | Grossman |
| 4,142,368 A | 3/1979 | Mantegani |
| 4,143,522 A | 3/1979 | Hamrick |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahnig |
| 4,173,431 A | 11/1979 | Smith |
| 4,189,925 A | 2/1980 | Long |
| 4,197,700 A | 4/1980 | Jahnig |
| 4,197,715 A | 4/1980 | Fawcett et al. |
| 4,201,514 A | 5/1980 | Huetter |
| 4,204,126 A | 5/1980 | Diggs |
| 4,206,601 A | 6/1980 | Eberle |
| 4,206,608 A | 6/1980 | Bell |
| 4,209,982 A | 7/1980 | Pitts |
| 4,215,548 A | 8/1980 | Beremand |
| 4,220,006 A | 9/1980 | Kindt |
| 4,229,143 A | 10/1980 | Pucher |
| 4,229,661 A | 10/1980 | Mead et al. |
| 4,232,253 A | 11/1980 | Mortelmans |
| 4,236,083 A | 11/1980 | Kenney |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,265,599 A | 5/1981 | Morton |
| 4,273,514 A | 6/1981 | Shore et al. |
| 4,274,010 A | 6/1981 | Lawson-Tancred |
| 4,275,310 A | 6/1981 | Summers et al. |
| 4,281,256 A | 7/1981 | Ahrens |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerling |
| 4,329,842 A | 5/1982 | Hoskinson |
| 4,335,093 A | 6/1982 | Salomon |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,362,462 A | 12/1982 | Blotenberg |
| 4,363,703 A | 12/1982 | ElDifrawi |

| Patent No. | Date | Inventor |
|---|---|---|
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,372,332 A | 2/1983 | Mast |
| 4,375,387 A | 3/1983 | deFilippi et al. |
| 4,380,419 A | 4/1983 | Morton |
| 4,393,752 A | 7/1983 | Meier |
| 4,411,136 A | 10/1983 | Funk |
| 4,421,661 A | 12/1983 | Claar et al. |
| 4,426,846 A | 1/1984 | Bailey |
| 4,428,711 A | 1/1984 | Archer |
| 4,435,131 A | 3/1984 | Ruben |
| 4,466,244 A | 8/1984 | Wu |
| 4,478,556 A | 10/1984 | Gozzi |
| 4,537,558 A | 8/1985 | Tsunoda et al. |
| 4,585,039 A | 4/1986 | Hamilton |
| 4,593,202 A | 6/1986 | Dickinson |
| 4,603,551 A | 8/1986 | Wood |
| 4,610,369 A | 9/1986 | Mercier |
| 4,706,685 A | 11/1987 | Jones, Jr. et al. |
| 4,714,411 A | 12/1987 | Searle |
| 4,761,118 A | 8/1988 | Zanarini et al. |
| 4,765,225 A | 8/1988 | Birchard |
| 4,784,579 A | 11/1988 | Gazzera |
| 4,849,648 A | 7/1989 | Longardner |
| 4,959,958 A | 10/1990 | Nishikawa et al. |
| 5,099,648 A | 3/1992 | Angle |
| 5,138,936 A | 8/1992 | Kent |
| 5,142,870 A | 9/1992 | Angle |
| 5,161,865 A | 11/1992 | Higashimate et al. |
| 5,169,295 A | 12/1992 | Stogner et al. |
| 5,179,837 A | 1/1993 | Sieber |
| 5,184,936 A | 2/1993 | Nojima |
| 5,253,619 A | 10/1993 | Richeson et al. |
| 5,259,738 A | 11/1993 | Salter et al. |
| 5,322,418 A | 6/1994 | Comer |
| 5,387,089 A | 2/1995 | Stogner et al. |
| 5,394,695 A | 3/1995 | Sieber |
| 5,537,822 A | 7/1996 | Shnaid et al. |
| 5,564,912 A | 10/1996 | Peck et al. |
| 5,584,664 A | 12/1996 | Elliott et al. |
| 5,622,478 A | 4/1997 | Elliott et al. |
| 5,634,340 A | 6/1997 | Grennan |
| 5,674,053 A | 10/1997 | Paul et al. |
| 5,716,197 A | 2/1998 | Paul et al. |
| 5,769,610 A | 6/1998 | Paul et al. |
| 5,771,693 A | 6/1998 | Coney |
| 5,782,612 A | 7/1998 | Margardt |
| 5,807,083 A | 9/1998 | Tomoiu |
| 5,839,270 A | 11/1998 | Jirnov et al. |
| 5,863,186 A | 1/1999 | Green et al. |
| 5,993,170 A | 11/1999 | Stevens et al. |
| 6,026,349 A | 2/2000 | Heneman |
| 6,052,992 A | 4/2000 | Eroshenko |
| 6,113,357 A | 9/2000 | Dobbs |
| 6,145,311 A | 11/2000 | Cyphelly |
| 6,206,660 B1 | 3/2001 | Coney et al. |
| RE37,603 E | 3/2002 | Coney |
| 6,371,145 B1 | 4/2002 | Bardon |
| 6,371,733 B1 | 4/2002 | Renfro |
| 6,397,794 B1 | 6/2002 | Sanderson et al. |
| 6,446,587 B1 | 9/2002 | Sanderson et al. |
| 6,460,450 B1 | 10/2002 | Sanderson et al. |
| 6,499,288 B1 | 12/2002 | Knight |
| 6,558,134 B2 | 5/2003 | Serafin et al. |
| 6,568,169 B2 | 5/2003 | Conde et al. |
| 6,568,911 B1 | 5/2003 | Brightwell et al. |
| 6,638,024 B1 | 10/2003 | Hancock |
| 6,652,241 B1 | 11/2003 | Alder |
| 6,652,243 B2 | 11/2003 | Krasnov |
| 6,655,155 B2 | 12/2003 | Bishop |
| 6,695,591 B2 | 2/2004 | Grimmer et al. |
| 6,711,984 B2 | 3/2004 | Tagge et al. |
| 6,725,671 B2 | 4/2004 | Bishop |
| 6,733,253 B2 | 5/2004 | Vockroth |
| 6,817,185 B2 | 11/2004 | Coney et al. |
| 6,829,978 B2 | 12/2004 | Sanderson et al. |
| 6,854,377 B2 | 2/2005 | Sanderson et al. |
| 6,913,447 B2 | 7/2005 | Fox et al. |
| 6,915,765 B1 | 7/2005 | Sanderson et al. |
| 6,925,973 B1 | 8/2005 | Sanderson et al. |
| 6,957,632 B1 | 10/2005 | Carlson et al. |
| 6,959,546 B2 | 11/2005 | Corcoran |
| 6,994,104 B2 | 2/2006 | Bishop et al. |
| 6,997,685 B2 | 2/2006 | Lemmen |
| 7,001,158 B2 | 2/2006 | Dunn |
| 7,007,589 B1 | 3/2006 | Sanderson |
| 7,011,469 B2 | 3/2006 | Sanderson et al. |
| 7,021,602 B2 | 4/2006 | Davis et al. |
| RE39,249 E | 8/2006 | Link, Jr. |
| 7,210,496 B2 | 5/2007 | Suzuki |
| 7,219,682 B2 | 5/2007 | Agnew et al. |
| 7,257,952 B2 | 8/2007 | Bishop et al. |
| 7,308,361 B2 | 12/2007 | Enis et al. |
| 7,377,492 B2 | 5/2008 | Vrana et al. |
| 7,395,748 B2 | 7/2008 | Krimbacher |
| 7,488,159 B2 | 2/2009 | Bhatt et al. |
| 7,527,482 B2 | 5/2009 | Ursan et al. |
| 7,530,300 B2 | 5/2009 | Hornstein |
| 7,543,668 B1 | 6/2009 | Schechter |
| 7,604,064 B2 | 10/2009 | Irwin, Jr. |
| 7,610,955 B2 | 11/2009 | Irwin, Jr. |
| 7,640,736 B2 | 1/2010 | Arbel et al. |
| 7,656,055 B2 | 2/2010 | Torres et al. |
| 7,663,255 B2 | 2/2010 | Kim et al. |
| 7,696,632 B1 | 4/2010 | Fuller |
| 7,802,426 B2 | 9/2010 | Bollinger |
| 7,832,207 B2 | 11/2010 | McBride et al. |
| 7,874,155 B2 | 1/2011 | McBride et al. |
| 1,005,636 A1 | 3/2011 | McBride at al. |
| 7,900,444 B1 | 3/2011 | McBride et al. |
| 2003/0180155 A1 | 9/2003 | Coney et al. |
| 2005/0180864 A1 | 8/2005 | Ursan et al. |
| 2006/0078445 A1 | 4/2006 | Carter, III et al. |
| 2006/0218908 A1 | 10/2006 | Abou-Raphael |
| 2006/0248886 A1 | 11/2006 | Ma |
| 2007/0187918 A1 | 8/2007 | Mizuno |
| 2008/0060862 A1 | 3/2008 | Schlele et al. |
| 2008/0163618 A1 | 7/2008 | Paul |
| 2009/0260361 A1 | 10/2009 | Prueitt |
| 2009/0282822 A1 | 11/2009 | McBride et al. |
| 2009/0301089 A1 | 12/2009 | Bollinger |
| 2010/0018196 A1 | 1/2010 | Li et al. |
| 2010/0089063 A1 | 4/2010 | McBride et al. |
| 2010/0139277 A1 | 6/2010 | McBride et al. |
| 2010/0205960 A1 | 8/2010 | McBride et al. |
| 2010/0229544 A1 | 9/2010 | Bollinger et al. |
| 2010/0307156 A1 | 12/2010 | Bollinger et al. |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1* | 3/2011 | McBride et al. ............ 91/165 |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0079010 A1 | 4/2011 | McBride et al. |
| 2011/0083438 A1 | 4/2011 | McBride et al. |
| 2011/0131966 A1 | 6/2011 | McBride et al. |
| 2011/0167813 A1 | 7/2011 | McBride et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |

FOREIGN PATENT DOCUMENTS

| | | |
|---|---|---|
| WO | WO 90/03516 | 4/1990 |
| WO | WO 93/06367 | 4/1993 |
| WO | WO 98/17492 | 4/1998 |
| WO | WO 2005/069847 | 8/2005 |
| WO | WO 2008/139267 | 11/2008 |
| WO | WO 2009/034548 | 3/2009 |
| WO | WO 2010/135658 | 11/2010 |
| WO | WO-2011/056855 A1 | 5/2011 |
| WO | WO 2011/079267 | 6/2011 |
| WO | WO-2011/079267 A1 | 6/2011 |
| WO | WO 2011/079271 | 6/2011 |
| WO | WO-2012/097216 A1 | 7/2012 |

OTHER PUBLICATIONS

Office Action for U.S. Appl. No. 13/294,660, mailed Jan. 18, 2012, 7 pages.

International Search Report and Written Opinion for International Application No. PCT/US2010/062016, mailed Jan. 19, 2012.

Cyphelly et al., "Usage of Compressed Air Storage Systems," Program Elektricity, Final Report May 2004, Ordered by the Swiss Federal Office of Energy.

Ahrens, F. W., "Preliminary Evaluation of the Use of Hydraulic Air Compressors in Water-Compensated Reservoir Compressed Air Storage Power Plants," NTIS, Prepared for CAES Technology Symposium 1978, May 15-17, 1978, Pacific Grove, CA, Argonne National Laboratory, Argonne, Illinois, 24 pages.

Berghmans, J. A. et al., "Performance of a Hydraulic Air Compressor for Use in Compressed Air Energy Storage Power Systems," Smithsonian/NASA ADS Physics Abstract Service, Presented at Symp. on Fluids Eng. in Advanced Energy Conversion Systems, ASME Winter Ann. Meeting, San Francisco, Dec. 10-15.

Carbon Trust, "Hydraulic Transmission System for Large Wind Turbines," Jan. 2007, 1 page.

Erbe, R., "Water Works: Less Expensive Than Oil and Environmentally Friendly, Water-Based Hydraulics Deserve a Closer Look," Machine Design, Sep. 13, 2007, vol. 116, 5 pages.

Hydraulics & Pneumatics, Piston Pumps [online], [retrieved on Oct. 17, 2007]. Retrieved from the Internet: <URL: http://www.hydraulicspneumatics.com/200/FPE/pumps/article/true/6402>, 2007, Penton Media Inc., 4 pages.

Hydraulics & Pneumatics, Wobble-Plate Piston Pump [online], [retrieved on Oct. 18, 2007]. Retrieved from the Internet: <URL: http://www.hydraulicspneumatics.com/200/issue/article/true/43640>, 2007, Penton Media, Inc., 13 pages.

Moore, J. J. et al., "Conceptual Design Study of Hydraulic Compression for Wind Turbine Driven Air Compression," Final Report, SwRI Project No. 18.18094.01.016, Jun. 6, 2008, Southwest Research institute, 50 pages.

Sanderson Engine Development, "Application of Sanderson Mechanism for Conversion Between Linear and Rotary Motion," [online], [retrieved on May 8, 2008]. Retrieved from the Internet: <URL: http://www.sandersonengine.com/html/projects.html>, 2 pages.

Simetric, "Mass, Weight, Density or Specific Gravity of Liquids," [online], [retrieved on Jan. 2, 2008]. Retrieved from the Internet: <URL: http://www.simetric.co.uk/si_liquids.htm>, 5 pages.

"Swash-plate Type Axial Piston Pumps for Open Circuits in General Industrial Machinery," Kawasaki K3VG, Kawasaki Motor Corp., USA, 2006, 24 pages.

International Search Report and Written Opinion for International Application No. PCT/US2010/062010, mailed Apr. 13, 2011.

International Search Report and Written Opinion for International Application No. PCT/US2010/035795, mailed Oct. 13, 2011.

Invitation to Pay Additional Fees and Communication Relating to the Results of the Partial International Search for International Application No. PCT/US2010/035795, dated May 31, 2011, 6 pages.

Office Action for U.S. Appl. No. 12/785,093, mailed Oct. 31, 2011, 7 pages.

Office Action for U.S. Appl. No. 12/785,100, mailed Nov. 23, 10 pages.

Office Action for U.S. Appl. No. 13/294,862, mailed Jan. 30, 2011 6 pages.

International Search Report and Written Opinion for International Patent Application No. PCT/US2012/064485 dated Feb. 18, 2013 (14 pages).

International Search Report and Written Opinion for International Patent Application No. PCT/US2012/064487 dated Feb. 22, 2013 (13 pages).

* cited by examiner

SYSTEMS AND METHODS FOR COMPRESSING AND/OR EXPANDING A GAS UTILIZING A BI-DIRECTIONAL PISTON AND HYDRAULIC ACTUATOR

BACKGROUND

The invention relates generally to systems, devices and methods for the compression and/or expansion of a gas, such as air, and particularly to a system, device and method for optimizing the energy efficiency and power density of a compressed air energy storage system.

Traditionally, electric power plants have been sized to accommodate peak power demand. Moreover, electric power plant sizing must take into account their maximum power output, minimum power output, and a middle power output range within which they most efficiently convert fuel into electricity. Electric power plants are also constrained in terms of how quickly they can start-up and shut-down, and it is commonly infeasible to completely shut-down a power plant. The combination of power output constraints, and start-up and shut-down constraints, restricts a power plant's ability to optimally meet a fluctuating power demand. These restrictions may lead to increased green house gas emissions, increased overall fuel consumption, and/or to potentially higher operating costs, among other drawbacks. Augmenting a power plant with an energy storage system may create an ability to store power for later use, which may allow a power plant to fulfill fluctuating consumer demand in a fashion that minimizes these drawbacks.

An energy storage system may improve overall operating costs, reliability, and/or emissions profiles for electric power plants. Existing energy storage technologies, however, have drawbacks. By way of example, batteries, flywheels, capacitors and fuel cells may provide significant power with relatively fast response times, but have limited energy storage capabilities which limits their utility, and these storage technologies may be costly to implement. Installations of other larger energy capacity systems, such as pumped hydro systems, require particular geological formations that might not be available at all locations.

Intermittent electric power production sites, such as some wind farms, may have capacities that exceed transmission capabilities. Absent suitable energy storage systems, such intermittent power production sites may not be capable of operating at full capacity. The applicants have appreciated that intermittent production sites may benefit from a storage system that may store energy when the production site is capable of producing energy at rates higher than may be transmitted. The energy that is stored may be released through the transmission lines when power produced by the intermittent power producting site alone is lower than transmission line capacity.

Electric power consumption sites, such as buildings, towns, cities, commercial facilities, military facilities, may have consumption that periodically exceeds electricity transmission capabilities. Absent suitable energy storage systems, such electric power consumers may not be capable of operating at preferred levels. The applicants have appreciated that transmission constrained consumption sites may benefit from a storage system that may store energy when the consumption site is consuming energy at rates lower than may be transmitted, and when the transmitted energy that is not immediately consumed may be stored. The energy that is stored may be released to the consumers when power consumption of the consumers is higher than the transmission line capacity. Electric energy may also be stored during off-peak time periods (e.g., at night) when electricity is generally less expensive and released during peak time periods (e.g., during the day) when electricity is generally more expensive.

Compressed air energy storage systems (CAES) are another known type of system in limited use for storing energy in the form of compressed air. CAES systems may be used to store energy, in the form of compressed air, when electricity demand is lower than the ready electricity supply, typically during the night, and then to release the energy when demand is higher than the ready electricity supply, typically during the day. Such systems include an air compressor that operates, often at a constant speed, to compress air for storage. Turbines, separate from the compressor, are typically used to expand compressed air to produce electricity. Turbines, however, often require the compressed air to be provided at a relatively constant pressure, such as around 35 atmospheres. Additionally or alternatively, air at pressures higher than 35 atmospheres may need to be throttled prior to expansion in the turbine, incurring energy losses that reduce the efficiency of the system, and/or reduce the energy density that a storage structure may accommodate. Additionally, to increase electrical energy produced per unit of air expanded through the turbine, compressed air in such systems is often heated and/or pre-heated to elevated temperatures (e.g., 1,000° C.) during and/or prior to expansion by burning fossil fuels, which both increases the cost of energy from the system and produces fuel combustion emissions associated with the storage of energy.

Known CAES-type systems for storing energy as compressed air have a multi-stage compressor that may include intercoolers that cool air between stages of compression and/or after-coolers that cool air after compression. In such a system, the air may still achieve substantial temperatures during each stage of compression prior to being cooled, which introduces inefficiencies in the system. Thus, there is a need to provide for CAES type systems that have improved efficiencies.

A CAES system may be implemented using a hydraulic drive system comprised of hydraulic components including components such as hydraulic pumps used to drive working pistons. Therefore, there is also a need for systems and methods to obtain a high efficiency output of a compressed air energy storage system, or other systems used to compress and/or expand gas, including controls and operating modes that leverage bi-directional piston movement during operation of such a system.

SUMMARY OF THE INVENTION

Systems, methods and devices for optimizing bi-directional piston movement within a device or system used to compress and/or expand a gas, such as air, are described herein. In some embodiments, a compressed air device and/or system can include a first pneumatic cylinder, a second pneumatic cylinder, a hydraulic actuator, and a hydraulic controller. The first pneumatic cylinder has a first working piston disposed therein for reciprocating movement in the first pneumatic cylinder and which divides the first pneumatic cylinder into a first pneumatic chamber and a second pneumatic chamber, each fluidically coupleable to a gas source. The hydraulic actuator is coupled to the first working piston. The second pneumatic cylinder has a second working piston disposed therein for reciprocating movement in the second pneumatic cylinder and which divides the second pneumatic cylinder into a third pneumatic chamber and a fourth pneumatic chamber, each fluidically coupleable to a compressed gas storage chamber. The hydraulic controller is fluidically coupleable to the hydraulic actuator and is operable in a compression mode in which gas is discharged from the second pneumatic cylinder to the compressed gas storage chamber at a higher pressure than it enters the first pneumatic cylinder from the gas source, and an expansion mode in which gas is discharged from the first pneumatic cylinder to the gas source at a lower pressure than it enters the second pneumatic cylinder from the compressed gas storage chamber. Operation of the hydraulic controller in the compression mode produces a hydraulic actuator force on the first working piston sufficient to move the first working piston: a) in a first direction such that gas contained in the first pneumatic chamber is discharged from the first pneumatic chamber into the third pneumatic chamber, and b) in a second, opposite, direction such that gas contained in the second pneumatic chamber is discharged from the second pneumatic chamber into the fourth pneumatic chamber.

DETAILED DESCRIPTION

Figure 1:
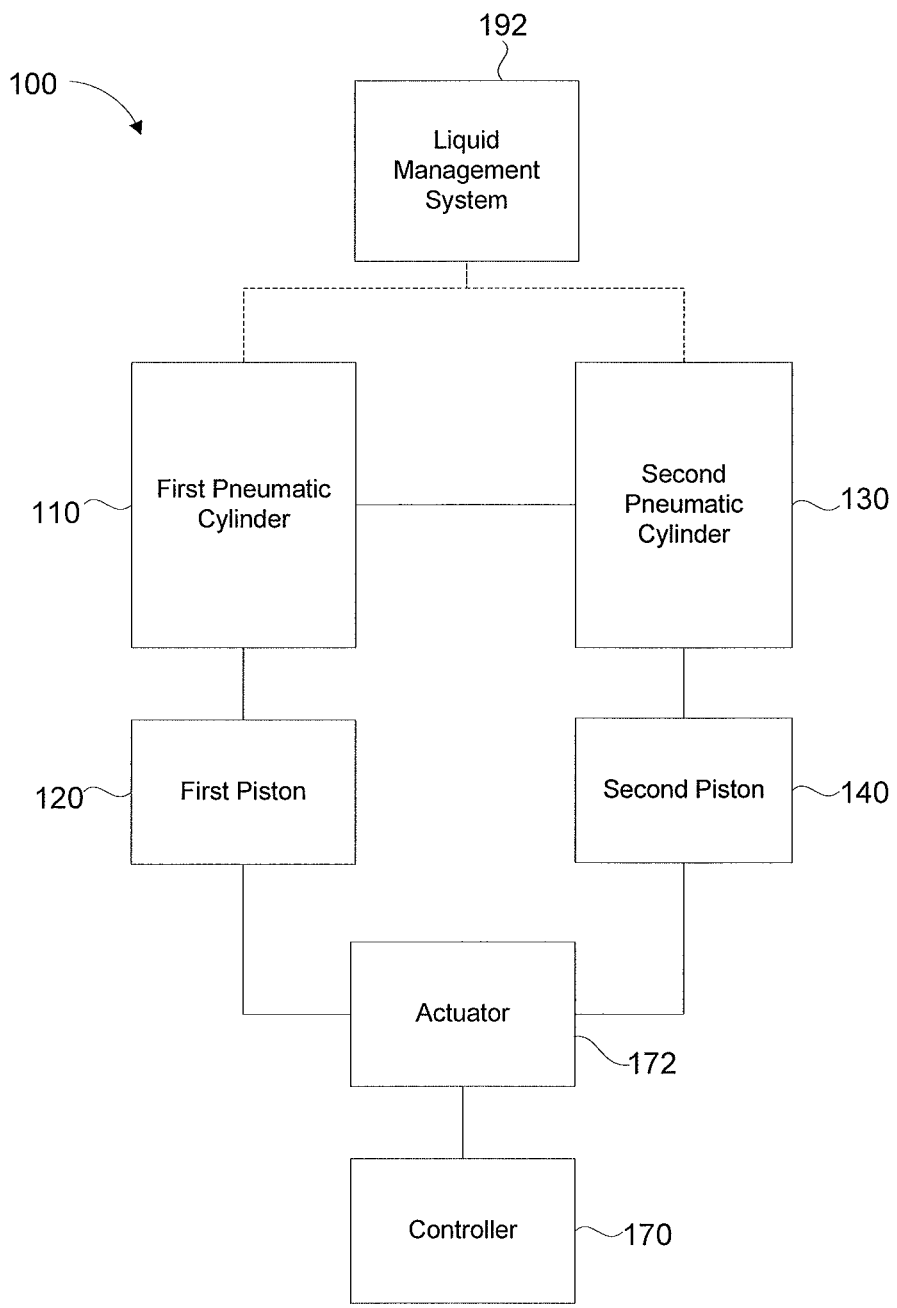
FIG. 1 is a schematic illustration of a compression and/or expansion system according to an embodiment.

Systems, devices and methods for optimizing and efficiently operating a gas compression and/or expansion system are disclosed herein. The gas compression and/or expansion systems can include one or more double-acting working pistons movably disposed within a cylinder to compress gas within a working chamber and configured to compress gas when moved in more than one direction. For example, the double-acting piston can be configured to compress gas both when moved in a first direction and when moved in a second direction opposite to the first direction. As used herein the term "piston" is not limited to pistons of circular cross-section, but can include pistons with a cross-section of a triangular, rectangular, multi-sided shape, or conformable shape. The gas compression and/or expansion systems can be configured for two or more stages of gas compression and/or expansion.

In some embodiments, the double-acting working piston within a gas compression and/or expansion system can be driven by or drive one or more hydraulic actuators. The hydraulic loads applied to the working piston(s) can be varied during a given cycle of the system. For example, by applying hydraulic fluid pressure to different hydraulic pistons, and/or different surfaces of the piston(s) within the hydraulic actuator(s), the ratio of the net working surface area of the hydraulic actuator to the working surface area of the working piston acting on the gas in the working chamber can be varied, and therefore the ratio of the hydraulic fluid pressure to the gas pressure in the working chamber can be varied during a given cycle or stroke of the system. In addition, the number of working pistons per working chamber can be varied within a given cycle. In addition, the hydraulic actuator can vary piston area ratio within a given cycle.

In some embodiments, an actuator can include one or more pump systems, such as for example, one or more hydraulic pumps that can be use to move one or more fluids within the actuators. U.S. Provisional App. No. 61/216,942, to Ingersoll, et al., filed May 22, 2009, entitled "Compressor and/or Expander Device," and U.S. patent application Ser. Nos. 12/785,086, 12/785,093 and 12/785,100, each filed May 21, 2010 and entitled "Compressor and/or Expander Device" (collectively referred to herein as the "the Compressor and/or Expander Device applications"), the disclosures of which are hereby incorporated herein by reference, in their entireties, describe various energy compression and/or expansion systems in which the systems and methods described herein can be employed.

The hydraulic actuator can be coupleable to a hydraulic pump, which can have efficient operating ranges that can vary as a function of, for example, flow rate and pressure, among other parameters. Systems and methods of operating the hydraulic pumps/motors to allow them to function at an optimal efficiency throughout the stroke or cycle of the gas compression and/or expansion system are described in U.S. patent application Ser. No. 12/977,724 to Ingersoll, et al., filed Dec. 23, 2010, entitled "Systems and Methods for Optimizing Efficiency of a Hydraulically Actuated System," ("the '724 application") the disclosure of which is incorporated herein by reference in its entirety.

In some embodiments, the devices and systems described herein can be configured for use only as a compressor. For example, in some embodiments, a compressor device described herein can be used as a compressor in a natural gas pipeline, a natural gas storage compressor, or any other industrial application that requires compression of a gas. In another example, a compressor device described herein can be used for compressing carbon dioxide. For example, carbon dioxide can be compressed in a process for use in enhanced oil recovery or for use in carbon sequestration. In another example, a compressor device described herein can be used for compressing air. For example, compressed air can be used in numerous applications which may include cleaning applications, motive applications, ventilation applications, air separation applications, cooling applications, amongst others.

In some embodiments, the devices and systems described herein can be configured for use only as an expansion device. For example, an expansion device as described herein can be used to generate electricity or to modify the pressure of gas, also referred to as pressure regulation. In some embodiments, an expansion device as described herein can be used in a natural gas transmission and distribution system. For example, at the intersection of a high pressure (e.g., 500 psi) transmission system and a low pressure (e.g., 50 psi) distribution system, energy can be released where the pressure is stepped down from the high pressure to a low pressure. An expansion device as described herein can use the pressure differential to generate electricity. In other embodiments, an expansion device as described herein can be used in other gas systems to harness the energy from high to low pressure regulation.

FIG. 1 schematically illustrates a compression and/or expansion device (also referred to herein as "compression/ expansion device") according to an embodiment. A compression/expansion device 100 can include one or more pneumatic cylinders 110, 130, one or more pistons 120, 140, at least one actuator 172, a controller 170, and, optionally, a liquid management system 192. The compression/expansion device 100 can be used, for example, in a CAES system.

The piston 120 (referred to herein as "first piston") is configured to be at least partially and movably disposed in the first pneumatic cylinder 110. The first piston 120 divides the first pneumatic cylinder 110 into, and defines therewith, a first pneumatic chamber (not shown in FIG. 1) and a second pneumatic chamber (not shown in FIG. 1). The first piston 120 can also be coupled to the actuator 172 via a piston rod (not shown in FIG. 1). The actuator 172 can be for example, an electric motor or a hydraulically driven actuator such as, for example, the hydraulic actuators described in the '724 application, incorporated by reference above. The actuator 172 can be used to move the first piston 120 back and forth within the first pneumatic cylinder 110. As the first piston 120 moves back and forth within the first pneumatic cylinder 110, a volume of the first pneumatic chamber and a volume of the second pneumatic chamber will each change. For example, the first piston 120 can be moved between a first position in which the first pneumatic chamber has a volume according to an embodiment greater than a volume of the second pneumatic chamber, and a second position in which the second pneumatic chamber has a volume greater than a volume of the first pneumatic chamber.

The piston 140 (referred to herein as "second piston") is configured to be at least partially disposed in the second pneumatic cylinder 130. The second piston divides the second pneumatic cylinder into, and defines therewith, a third pneumatic chamber (not shown in FIG. 1) and a fourth pneumatic chamber (not shown in FIG. 1). The second piston 140 can also be coupled to the actuator 172 via a piston rod (not shown in FIG. 1). The actuator 172 can be used to move the second piston 140 back and forth within the second pneumatic cylinder 130. As the second piston 140 moves back and forth within the second pneumatic cylinder 130, a volume of the third pneumatic chamber and a volume of the fourth pneumatic chamber will each change. For example, the second piston 140 can be moved between a first position in which the third pneumatic chamber has a volume greater than a volume of the fourth pneumatic chamber, and a second position in which the fourth pneumatic chamber has a volume greater than a volume of the third pneumatic chamber.

Each piston 120, 140 can be moved within its respective pneumatic cylinder 110, 130 to compress and/or expand a gas, such as air, within the cylinder. In some embodiments, the compression/expansion device 100 can be configured to be double-acting, in that at least one of the pistons 120, 140 can be actuated by movement in either of two directions. In other words, the pistons 120, 140 can be actuated to compress and/or expand gas (e.g., air) in two directions. For example, in some embodiments, as the first piston 120 is moved in a first direction, a first volume of gas having a first pressure disposed in the first pneumatic chamber (not shown in FIG. 1) of the first pneumatic cylinder 110 can be compressed by one side of the first piston 120 to a second pressure greater than the first pressure, and a second volume of gas having a third pressure can enter the second pneumatic chamber (not shown in FIG. 1) on the other side of the first piston 120. When the first piston 120 is moved in a second direction opposite the first direction, the second volume of gas within the second pneumatic chamber can be compressed by the first piston 120 to a fourth pressure greater than the third pressure, and simultaneously a third volume of gas can enter the first pneumatic chamber. The second piston 140 can be similarly operable with respect to the third and fourth pneumatic chambers of the second pneumatic cylinder 130.

In some embodiments, during a compression and/or an expansion cycle, the first pneumatic chamber may be in fluid communication with the third pneumatic chamber, and the second pneumatic chamber may be in fluid communication with the fourth pneumatic chamber. In this manner, the volume of the first pneumatic chamber in which gas can be contained can be larger than the volume of the third pneumatic chamber in which gas can be contained, and the volume of the second pneumatic chamber in which gas can be contained can be larger than the volume of the fourth pneumatic chamber in which gas can be contained. As such, movement of the first and second pistons 120, 140 (e.g., by the actuator 172) within each of the first and second pneumatic cylinders 110, 130, respectively, can change the combined volume of the first pneumatic chamber and the third pneumatic chamber, and the combined volume of the second pneumatic chamber and the fourth pneumatic chamber. Decreasing the combined pneumatic volume compresses the contained gas. Increasing the combined volume allows the gas to expand). The controller 170 is configured to control distribution of an input of hydraulic power, which can then be used to drive the actuator 172, such as when the compression/expansion device 100 is operating to compress gas (i.e., a compression mode). The controller 170 can also be configured to control distribution of hydraulic power to a pump, motor, or pump/motor (not shown in FIG. 1), where the hydraulic power can be converted into mechanical power, such as when the compression/expansion device 100 is operating to expand a gas (i.e., an expansion mode).

In use, the compression/expansion device 100 operates in the compression mode to compress gas during at least a first stage of compression, in which the gas is compressed to a first pressure greater than an initial pressure, and a second stage of compression, in which the gas is compressed to a second pressure greater than the first pressure. Similarly, the compression/expansion device 100 can operate in the expansion mode to expand gas during at least a first stage of expansion, in which the gas is permitted to expand to a first pressure lower than the pressure of the gas in storage, and a second stage of expansion, in which the gas is permitted to expand to a second pressure lower than the first pressure.

Each of the first pneumatic cylinder 110 and second pneumatic cylinder 130 can include one or more gas inlet/outlet conduits (not shown in FIG. 1) in fluid communication with their respective pneumatic chambers. The pneumatic chambers can contain at various time periods during a compression and/or expansion cycle, a quantity of gas (e.g., air) that can be communicated to and from the pneumatic chambers via the inlet/outlet conduits. The compression/expansion device 100 can also include multiple valves (not shown in FIG. 1) coupled to the inlet/outlet conduits and/or to the pneumatic cylinders 110, 130. The valves can be configured to operatively open and close the fluid communication to and from the pneumatic chambers. Examples of use of such valves are described in more detail in the Compressor and/or Expander Device applications incorporated by reference above.

The optional liquid management system 192 is configured to control the temperature of gas as it is compressed and/or expanded within the compression/expansion device 100, by selectively introducing a liquid into, and/or removing a liquid from, the pneumatic cylinders, which liquid can directly or indirectly receive heat energy from, or release heat energy to, gas in the pneumatic cylinders. For example, the liquid management system 192 can be configured to receive heat energy from, and thereby lower the temperature of the gas (relative to the same system without the liquid management system), such as when the compression/expansion device 100 is operating in the compression mode. In another example, the liquid management system 192 can be configured to release heat energy to, and thereby increase the temperature of, the gas, such as when the compression/expansion device 100 is operating in the expansion mode. In some embodiments, the liquid management system 192 is configured to be coupled to at least one of the first pneumatic cylinder 110 and the second pneumatic cylinder 130. Examples of devices and methods for optimizing heat transfer within a compression and/or expansion device are described in more detail in U.S. patent application Ser. No. 12/977,679 to Ingersoll, et al., filed Dec. 23, 2010, entitled "Methods and Devices for Optimizing Heat Transfer Within a Compression and/or Expansion Device" ("the '679 application"), incorporated herein by reference in its entirety.

Figure 2:
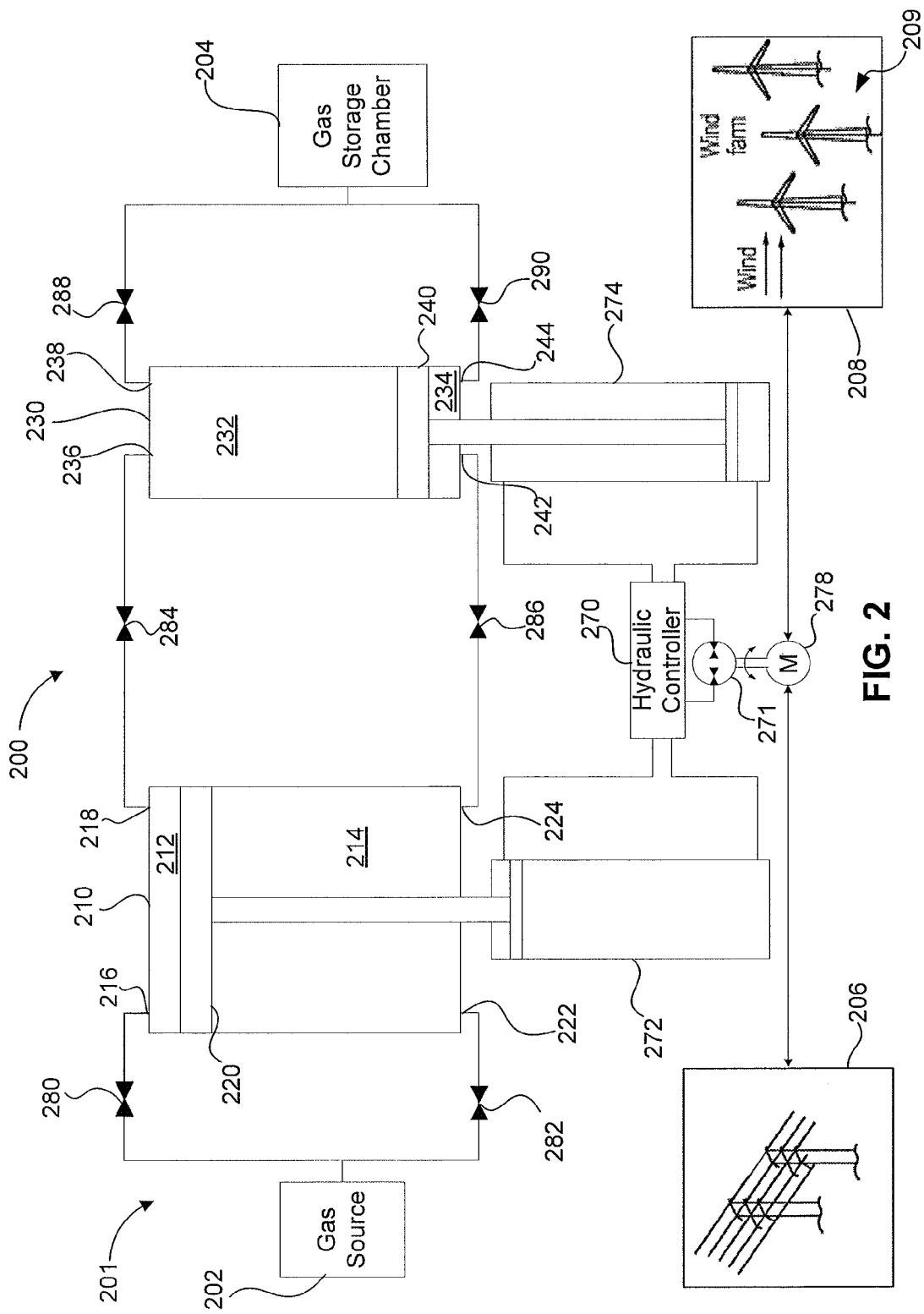
FIG. 2 is a schematic illustration of a compressed gas-based energy storage and recovery system, according to an embodiment.

FIG. 2 is a schematic illustration of an embodiment of an energy storage and recovery system 200 in which a compression/expansion device 201 may be used to both store energy and release energy that has previously been stored. Generally, as shown in FIG. 2, a source of electrical power, in this case a wind farm 208 including a plurality of wind turbines 209, may be used to harvest and convert wind energy to electric energy for delivery to a motor/generator 278. It is to be appreciated that the system 200 may be used with electric sources other than wind farms, such as, for example, with an electric power grid 206 or solar power sources (not shown). The motor/generator 278 converts the input electrical power from the wind turbines or other sources into mechanical power. That mechanical power can then be converted by a hydraulic pump/motor 271 into a hydraulic power. In turn, a hydraulic controller 270 controls distribution of the hydraulic power to drive one or more hydraulic actuators 272, 274 connected to the compression/expansion device 201.

Energy can be stored within the system 200 in the form of compressed gas, which can be expanded at a later time period to release the energy previously stored. To store energy generated by the wind farm 208, the hydraulic actuators 272, 274 can change the volume of respective pneumatic chambers 212, 214, 232, 234, as described in more detail herein. The reduction in volume compresses a gas contained therein. During this process, heat can be removed from the gas and transferred to the ambient or to a thermal management system. During compression, the gas is delivered to a downstream stage of the compression/expansion device 201 and eventually, at an elevated pressure, to a compressed gas storage chamber 204. At a subsequent time, for example, when there is a relatively high demand for power on the power grid 206, or when energy prices are favorable, compressed gas may be communicated from the storage chamber 204 and expanded through the compression/expansion device 201. Expansion of the compressed gas drives the hydraulic actuators 272, 274, which, in turn, displace fluid to generate hydraulic power. The hydraulic controller 270 directs the hydraulic power to the pump/motor 271, which converts the hydraulic power to mechanical power. In turn, the electric motor/generator 278 converts the mechanical power to electrical power for delivery to the power grid 206. During this process, heat can be added to the gas from the ambient or from a thermal management system.

The compression/expansion device 201, as illustrated in FIG. 2, includes a first pneumatic cylinder 210, a second pneumatic cylinder 230, the first actuator 272 operatively coupled to the first pneumatic cylinder via a first working piston 220, the second actuator 274 operatively coupled to the second pneumatic cylinder via a second working piston 240, and the hydraulic controller 270 operatively coupled to the first and second actuators 272, 274.

The first pneumatic cylinder 210 is configured for a first stage of gas compression. The first pneumatic cylinder 210 has the first working piston 220 disposed therein for reciprocating movement in the first pneumatic cylinder. The first working piston 220 divides the first pneumatic cylinder 210 into, and thereby defines, a first pneumatic chamber 212 and a second pneumatic chamber 214. The first pneumatic cylinder 210 is fluidically coupleable to the gas source. The first pneumatic chamber 212 includes a first fluid port 216 and a second fluid port 218. The second pneumatic chamber 214 includes a first fluid port 222 and a second fluid port 224. The first fluid port 216 of the first pneumatic chamber 212 and the first fluid port 222 of the second pneumatic chamber 214 are each fluidically coupleable to a source of gas 202. The gas source 202 can be, for example, atmospheric air, another source of gas, or another compressor.

The second pneumatic cylinder 230 is configured for a second stage of gas compression. The second pneumatic cylinder 230 has the second working piston 240 disposed therein for reciprocating movement in the second pneumatic cylinder. The second working piston 240 divides the second pneumatic cylinder 230 into, and thereby defines, a third pneumatic chamber 232 and a fourth pneumatic chamber 234. The third and fourth pneumatic chambers 232, 234 of the second pneumatic cylinder 230 have a collective volume less than the collective volume of the first and second pneumatic chambers 212, 214 of the first pneumatic cylinder 210. Additionally, a maximum volume of each of the third and fourth pneumatic chambers 232, 234 is less than a maximum volume of each of the first and second pneumatic chambers 212, 214.

The third pneumatic chamber 232 includes a first fluid port 236 and a second fluid port 238. The fourth pneumatic chamber 234 includes a first fluid port 242 and a second fluid port 244. The second pneumatic cylinder 230 is configured to be fluidically coupleable to the first pneumatic cylinder 210. Specifically, the first fluid port 236 of the third pneumatic chamber 232 is configured to be fluidically coupleable to the second fluid port 218 of the first pneumatic chamber 212. In this manner, gas can be communicated from the first pneumatic chamber 212 via the fluid ports 218, 236 into the third pneumatic chamber 232. Additionally, the first fluid port 242 of the fourth pneumatic chamber 234 is configured to be fluidically coupleable to the second fluid port 224 of the second pneumatic chamber 214. In this manner, gas can be communicated from the second pneumatic chamber 214 via the fluid ports 224, 242 into the fourth pneumatic chamber 234.

The second pneumatic cylinder 230 is configured to be fluidically coupleable to the compressed gas storage chamber 204. Specifically, the second fluid port 238 of the third pneumatic chamber 232 is fluidically coupleable to the gas storage chamber, and the second fluid port 244 of the fourth pneumatic chamber 234 is fluidically coupleable to the compressed gas storage chamber 204.

As noted above, each of the first working piston 220 and the second working piston 240 are configured for reciprocating movement in the first pneumatic cylinder 210 and the second pneumatic cylinder 230, respectively. The first working piston 220 is coupled to the first hydraulic actuator 272, and the second working piston 220 is coupled to the second hydraulic actuator 274. The first hydraulic actuator 272 and the second hydraulic actuator 274 are each fluidically coupleable to the hydraulic controller 270.

The hydraulic controller is operable in a compression mode in which gas is discharged from the second pneumatic cylinder 230 to the compressed gas storage chamber at a higher pressure than it enters the first pneumatic cylinder 210 from the gas source 202. In the compression mode, the hydraulic controller 270 is configured to produce a hydraulic actuator force via the first hydraulic actuator 272 on the first working piston 220. Such hydraulic actuator force is sufficient to move the first working piston 220 in a first direction such that gas contained in the first pneumatic chamber 212 is discharged from the first pneumatic chamber into the third pneumatic chamber 232. During the complementary portion of the compression cycle, which is described in more detail below, the hydraulic actuator force is also sufficient to move the first working piston 220 in a second direction, opposite the first direction, such that gas contained in the second pneumatic chamber 214 is discharged from the second pneumatic chamber into the fourth pneumatic chamber 234. In the compression mode, the hydraulic controller 270 is also configured to produce a hydraulic actuator force via the second hydraulic actuator 274 on the second working piston 240. Such hydraulic actuator force is sufficient to move the second working piston 240 in a first direction such that gas contained in the third pneumatic chamber 232 is discharged from the third pneumatic chamber into the compressed gas storage chamber 204. The hydraulic actuator force is also sufficient to move the second working piston 220 in a second direction, opposite the first direction, such that gas contained in the fourth pneumatic chamber 234 is discharged from the fourth pneumatic chamber into the compressed gas storage chamber 204.

The hydraulic controller is also operable in an expansion mode in which gas is discharged from the first pneumatic cylinder 210 to the gas source 202 at a lower pressure than it enters the second pneumatic cylinder 230 from the compressed gas storage chamber 204. In the expansion mode, gas can be transferred from the storage chamber 204 into the second pneumatic cylinder 230, and, when gas expands in at least one of the third pneumatic chamber 232 and the fourth pneumatic chamber 234 of the second pneumatic cylinder 230, the gas exerts a force on the second working piston 240, thereby moving the second working piston in one of the first direction and the second direction. When the second working piston 240 is moved by the expanding gas, the second working piston is configured to produce a hydraulic actuator force via the second hydraulic actuator 274, i.e. to do work on the second hydraulic actuator 274. The hydraulic controller 270 controls distribution of the work done on the hydraulic actuator to the pump/motor 271, where the work can be converted into mechanical power, which can then be converted into electrical power by the motor/generator 278.

Similarly, in the expansion mode, gas can be managed through a first stage of expansion during which it is transferred from the second pneumatic cylinder 230 into the first pneumatic cylinder 210, where it can be managed through a second stage of expansion. When gas expands in at least one of the first pneumatic chamber 212 or the second pneumatic chamber 214 of the first pneumatic cylinder 210, the gas exerts a force on the first working piston 220, thereby moving the first working piston in one of the first direction or the second direction. When the first working piston 220 is moved by the expanding gas, the first working piston 220 is configured to produce a hydraulic actuator force via the first hydraulic actuator 272, i.e. to do work on the first hydraulic actuator 272. The hydraulic controller 270 controls distribution of the work done on the hydraulic actuator to the pump/motor 271, where the work can be converted into mechanical power, which can then be converted into electrical power by the motor/generator 278.

The compression/expansion device 201 can include one or more valves to control the flow of gas between the gas source 202 and the compressed gas storage chamber 204. For example, a first valve 280 can be configured to selectively permit the gas to flow between the gas source 202 and the first pneumatic chamber 212. Similarly, a second valve 282 can be configured to selectively permit the gas to flow between the gas source 202 and the second pneumatic chamber 214. A third valve 284 and a fourth valve 286 can be configured to selectively permit the flow of gas between the first pneumatic chamber 212 and the third pneumatic chamber 232 and between the second pneumatic chamber 214 and the fourth pneumatic chamber 234, respectively. A fifth valve 288 is configured to selectively control the flow of gas between the third pneumatic chamber 232 and the compressed gas storage chamber 204. Similarly, a sixth valve 290 is configured to selectively control the flow of gas between the fourth pneumatic chamber 234 and the compressed gas storage chamber 204.

In use, the energy storage and recovery system 200, and the compression/expansion system 201 particularly, is configured to operate in the compression mode to compress gas for storage. As noted above, wind energy can be harvested by the wind turbines 209 of the wind farm 208 and converted by the wind turbines into electric power for delivery to the motor/generator 278. The motor/generator 278 converts the electrical power into mechanical power that drives the hydraulic pump/motor 271 where the mechanical power is converted into hydraulic power. The hydraulic controller 270 controls power distribution by using appropriate software and/or a system of valves, to actuate each of the first hydraulic actuator 272 and the second hydraulic actuator 274. Upon actuation, the first hydraulic actuator 272 moves the first working piston 220 within the first pneumatic cylinder 210 in the first direction. As the first working piston 220 is moved in the first direction, gas contained in the first pneumatic chamber 212 is discharged from the first pneumatic chamber via its second fluid port 218 into the third pneumatic chamber 232 via its first fluid port 236. Upon actuation, the second hydraulic actuator 274 moves the second working piston 240 within the second pneumatic cylinder 230 in the second direction. As the second working piston 240 is moved in the second direction, gas contained in the fourth pneumatic chamber 234 is discharged from the fourth pneumatic chamber via its second fluid port 244 to the compressed gas storage chamber 204.

Upon further actuation of the first hydraulic actuator 272, the first hydraulic actuator moves the first working piston 220 within the first pneumatic cylinder 210 in the second direction. As the first working piston 220 is moved in the second direction, gas contained in the second pneumatic chamber 214 is discharged from the second pneumatic chamber via its second fluid port 224 into the fourth pneumatic chamber 234 via its first fluid port 242. Upon further actuation of the second hydraulic actuator 274, the second hydraulic actuator moves the second working piston 240 within the second pneumatic cylinder 230 in the first direction. As the second working piston 240 is moved in the first direction, gas contained in the third pneumatic chamber 232 is discharged from the third pneumatic chamber via its second fluid port 238 to the compressed gas storage chamber 204. In this manner, the second working piston 240 can be characterized as moving out of phase with the first working piston 220. In some embodiments, movement of the first working piston 240 in the first direction is substantially concurrent with movement of the second working piston 220 in the second direction, and vice versa. The compressed gas is then stored in the compressed gas storage chamber 204.

In use, the energy storage and recovery system 200, and the compression/expansion system 201 particularly, are also configured to operate in the expansion mode to expand compressed gas (e.g., to generate electrical energy). In the expansion mode, valve 290 admits through the second fluid port 244 a flow of compressed gas from the compressed gas storage chamber 204 into the fourth pneumatic chamber 234 of the second pneumatic cylinder 230. The gas is admitted into the fourth pneumatic chamber 234 is at a pressure that is high relative to the gas in the third pneumatic chamber 232, thereby exerting a force on the second working piston 240 that urges the second working piston to move in the first direction, thereby increasing the volume of the fourth pneumatic chamber 234 and decreasing the volume of the third pneumatic chamber 232. Movement of the second working piston 240 in the first direction causes the second hydraulic actuator 274 to displace a first volume of hydraulic fluid. When the second working piston 240 is moved in the first direction, gas contained in the third pneumatic chamber 232 is displaced to the first pneumatic chamber 212 through an open valve 284. In the first pneumatic chamber 212, the gas pressure is high relative to the gas pressure in the second pneumatic chamber 214, thereby exerting a force on the first working piston 220 that urges the first working piston 220 to move in the second direction, thereby increasing the volume of the first pneumatic chamber 212 and decreasing the volume of the second pneumatic chamber 214. Movement of the first working piston 220 in the second direction causes the first hydraulic actuator 272 to displace a second volume of hydraulic fluid. When the first working piston 220 moves in the second direction, gas contained in the second pneumatic chamber 214 is displaced from the second pneumatic chamber 214 to the gas source 202 through an open valve 282.

In the expansion mode, gas is also permitted to flow through valve 288 from the compressed gas storage chamber 204 into the third pneumatic chamber 232 of the second pneumatic cylinder 230. The gas entering the third pneumatic chamber 232 is at a high pressure relative to the gas pressure in the fourth pneumatic chamber 234, thereby exerting a force on the second working piston 240 that urges the second working piston 240 to move in the second direction, thereby increasing the volume of the third pneumatic chamber 232 and decreasing the volume of the fourth pneumatic chamber 234. Movement of the second working piston 240 in the second direction causes the second hydraulic actuator 274 to displace a third volume of hydraulic fluid. When the second working piston 240 is moved in the second direction, gas contained in the fourth pneumatic chamber 234 is displaced to the second pneumatic chamber 214. In the second pneumatic chamber 214, the displaced gas is allowed to expand and while expanding, it exerts a force on the first working piston 220 to move the first working piston in the first direction, thereby increasing the volume of the second pneumatic chamber and decreasing the volume of the first pneumatic chamber 212. Movement of the first working piston 220 in the second direction causes the first hydraulic actuator 272 to displace a fourth volume of hydraulic fluid. When the first working piston 220 is moved in the first direction, gas contained in the first pneumatic chamber 212 is displaced from the first pneumatic chamber to the gas source 202.

The displacement of each of the first and third volumes of fluid by the second actuator 274 and of the second and fourth volumes of fluid by the first actuator 272 generates hydraulic power which the hydraulic controller 270 directs to the pump/motor 271, where the hydraulic power is converted to mechanical power. The motor/generator 278 is configured to convert the mechanical power to electrical power, which can be delivered to the electric power grid 206 for consumption.

Figure 3:
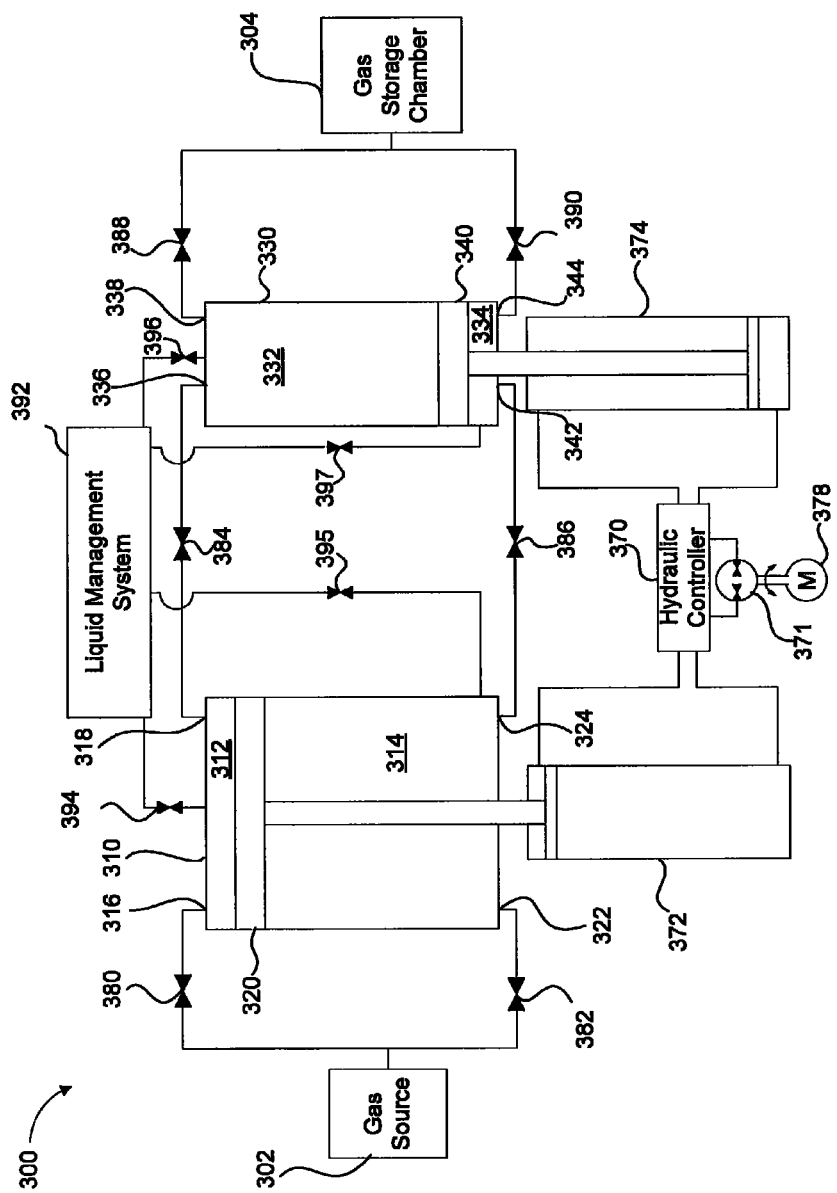
FIG. 3 is a schematic illustration of a compressed gas-based energy storage and, recovery system, according to an embodiment.

A compression/expansion device 300 according to an embodiment is illustrated in FIG. 3. The device 300 includes a first pneumatic cylinder 310 divided into a first pneumatic chamber 312 and a second pneumatic chamber 314 by a first working piston 320. The first working piston 320 is coupled to a first hydraulic actuator 372, which is fluidically coupleable to a hydraulic controller 370. The hydraulic controller 370 is configured to control distribution of a hydraulic force or power from a pump/motor 371 to the first hydraulic actuator 372 and a second hydraulic actuator 374, described below. The pump/motor 371 is configured to convert mechanical power received from a motor/generator 378 into hydraulic power, and to convert hydraulic power into mechanical power to be transferred to the motor/generator. The motor/generator 378 is configured to convert mechanical power into electrical power, and to convert electrical power into mechanical power.

The first and second pneumatic chambers 312, 314 of the first pneumatic cylinder 310 are fluidically coupleable to a gas source 302. Gas from the gas source can be introduced into the first pneumatic chamber 312 via a first fluid port 316 of the first pneumatic chamber and into the second pneumatic chamber 314 via a first fluid port 322 of the second pneumatic chamber. Flow of gas between the gas source 302 and the first and second pneumatic chambers 312, 314 can be selectively controlled with valves 380, 382, respectively.

The device 300 includes a second pneumatic cylinder 330 divided into a third pneumatic chamber 332 and a fourth pneumatic chamber 334 by a second working piston 340. The second working piston 340 is coupled to the second hydraulic actuator 374, which is fluidically coupleable to the hydraulic controller 370. The third and fourth pneumatic chambers 332, 334 of the second pneumatic cylinder 330 have a collective volume less than a collective volume of the first and second pneumatic chambers 312, 314 of the first pneumatic cylinder 310. Additionally, a maximum volume of each of the third and fourth pneumatic chambers 332, 334 is less than a maximum volume of each of the first and second pneumatic chambers 312, 314.

The first pneumatic chamber 312 is fluidically coupleable to the third pneumatic chamber 332. Specifically, gas can be permitted to flow out of a second fluid port 318 of the first pneumatic chamber 312 and into the third pneumatic chamber 332 via a first fluid port 336 of the third pneumatic chamber. Gas can also be permitted to flow out of a second fluid port 324 of the second pneumatic chamber 314 and into the fourth pneumatic chamber 334 via a first fluid port 342 of the fourth pneumatic chamber. Flow of gas between the first and third pneumatic chambers 312, 332 can be selectively controlled with valve 384, and flow of gas between the second and fourth pneumatic chambers 314, 334 can be selectively controlled with valve 386.

The third and fourth pneumatic chambers 332, 334 are fluidically coupleable to a compressed gas storage chamber 304. Specifically, gas can flow between the third pneumatic chamber 332 via a second fluid port 338 of the third pneumatic chamber and the compressed gas storage chamber 34, and between the fourth pneumatic chamber 334 via a second fluid port 344 of the fourth pneumatic chamber and the compressed gas storage chamber 304. Flow of gas between the third and fourth pneumatic chambers 332, 334 and the compressed gas storage chamber 304 can be selectively controlled with valves 388, 390, respectively.

The device 300 can be similar in many respects to the compression/expansion devices described herein (e.g., compression/expansion device 100, compression/expansion device 201) and includes components similar in many respects to similarly identified components of such devices. Additionally, the device 300 is similar in operation to compress and/or expand a gas, as described above with respect to devices 100, 201. The device 300 also includes a liquid management system 392. The liquid management system 392 is fluidically coupleable with the first and second pneumatic chambers 312, 314 of the first pneumatic cylinder 310 and with the third and fourth pneumatic chamber 332, 334 of the second pneumatic cylinder 330. As such, the liquid management system 392 is configured to transfer a heat transfer fluid to and/or from each pneumatic chamber 312, 314, 332, 334.

Flow of the heat transfer fluid between the liquid management system 392 and the first and second pneumatic chambers 312, 314 can be selectively controlled by valves 394, 395, respectively. Flow of the heat transfer fluid between the liquid management system 392 and the third and fourth pneumatic chambers 332, 334 can be selectively controlled by valves 396, 397, respectively. In this manner, the liquid management system 392 is configured to change or otherwise control a temperature of gas as it is compressed and/or expanded within the compression/expansion device 300. For example, the liquid management system 392 can be configured to lower the temperature of the gas (relative to the same system without the liquid management system), such as when the compression/expansion device 300 is operating in the compression mode, for example by transferring heat transfer fluid into at least one of the pneumatic chambers 312, 314, 332, 334 such that the heat transfer fluid can cool or otherwise draw heat away from gas contained within the respective pneumatic chamber.

In another example, the liquid management system 392 can be configured to increase the temperature of the gas, such as when the compression/expansion device 300 is operating in the expansion mode, for example by transferring heat transfer fluid into at least one of the pneumatic chambers 312, 314, 332, 334 such that the heat transfer fluid can increase the heat of gas contained within the respective chamber. Examples of devices and methods for optimizing heat transfer within a compression and/or expansion device are described in more detail in the '679 application incorporated by reference above.

Referring to FIGS. 4A-5E, a compression/expansion device 400 according to an embodiment is configured for inclusion in a system for storing energy and for releasing energy that has previously been stored. Specifically, the compression/expansion device 400 is configured to compress gas for storage and to expand gas that has previously been compressed. The device 400 can be similar in many respects to the compression/expansion devices described herein (e.g., compression/expansion device 100, compression/expansion device 201, compression/expansion device 300) and includes components similar in many respects to similarly identified components of such devices.

The device 400 includes a first pneumatic cylinder 410 divided into a first pneumatic chamber 412 and a second pneumatic chamber 414 by a first working piston 420. The first working piston 420 is coupled to a first hydraulic actuator 472, which is fluidically coupleable to a hydraulic controller 470. The first and second pneumatic chambers 412, 414 of the first pneumatic cylinder 410 are fluidically coupleable to a gas source 402. Gas from the gas source can be introduced into the first pneumatic chamber 412 via a first fluid port 416 of the first pneumatic chamber and into the second pneumatic chamber 414 via a first fluid port 422 of the second pneumatic chamber. Flow of gas between the gas source 402 and the first and second pneumatic chambers 412, 414 can be selectively controlled with valves 480, 482, respectively.

The device 400 includes a second pneumatic cylinder 430 divided into a third pneumatic chamber 432 and a fourth pneumatic chamber 434 by a second working piston 440. The second working piston 440 is coupled to a second hydraulic actuator 474, which is fluidically coupleable to the hydraulic controller 470. The third and fourth pneumatic chambers 432, 434 of the second pneumatic cylinder 430 have a collective volume less than a collective volume of the first and second pneumatic chambers 412, 414 of the first pneumatic cylinder 410. Additionally, a maximum volume of each of the third and fourth pneumatic chambers 432, 434 is less than a maximum volume of each of the first and second pneumatic chambers 412, 414.

The first pneumatic chamber 412 is fluidically couplable to the third pneumatic chamber 432. Specifically, gas can be permitted to flow between a second fluid port 418 of the first pneumatic chamber 412 and a first fluid port 436 of the third pneumatic chamber. Gas can also be permitted to flow between a second fluid port 424 of the second pneumatic chamber 414 and a first fluid port 442 of the fourth pneumatic chamber. Flow of gas between the first and third pneumatic chambers 412, 432 can be selectively controlled with valve 484, and flow of gas between the second and fourth pneumatic chambers 414, 434 can be selectively controlled with valve 486.

The third and fourth pneumatic chambers 432, 434 are each fluidically coupleable to a compressed gas storage chamber 404. Specifically, gas can flow between the third pneumatic chamber 432 via a second fluid port 438 of the third pneumatic chamber and the compressed gas storage chamber 44, and between the fourth pneumatic chamber 434 via a second fluid port 444 of the fourth pneumatic chamber and the compressed gas storage chamber 404. Flow of gas between the third and fourth pneumatic chambers 432, 434 and the compressed gas storage chamber 404 can be selectively controlled with valves 488, 490, respectively.

Figure 4A:
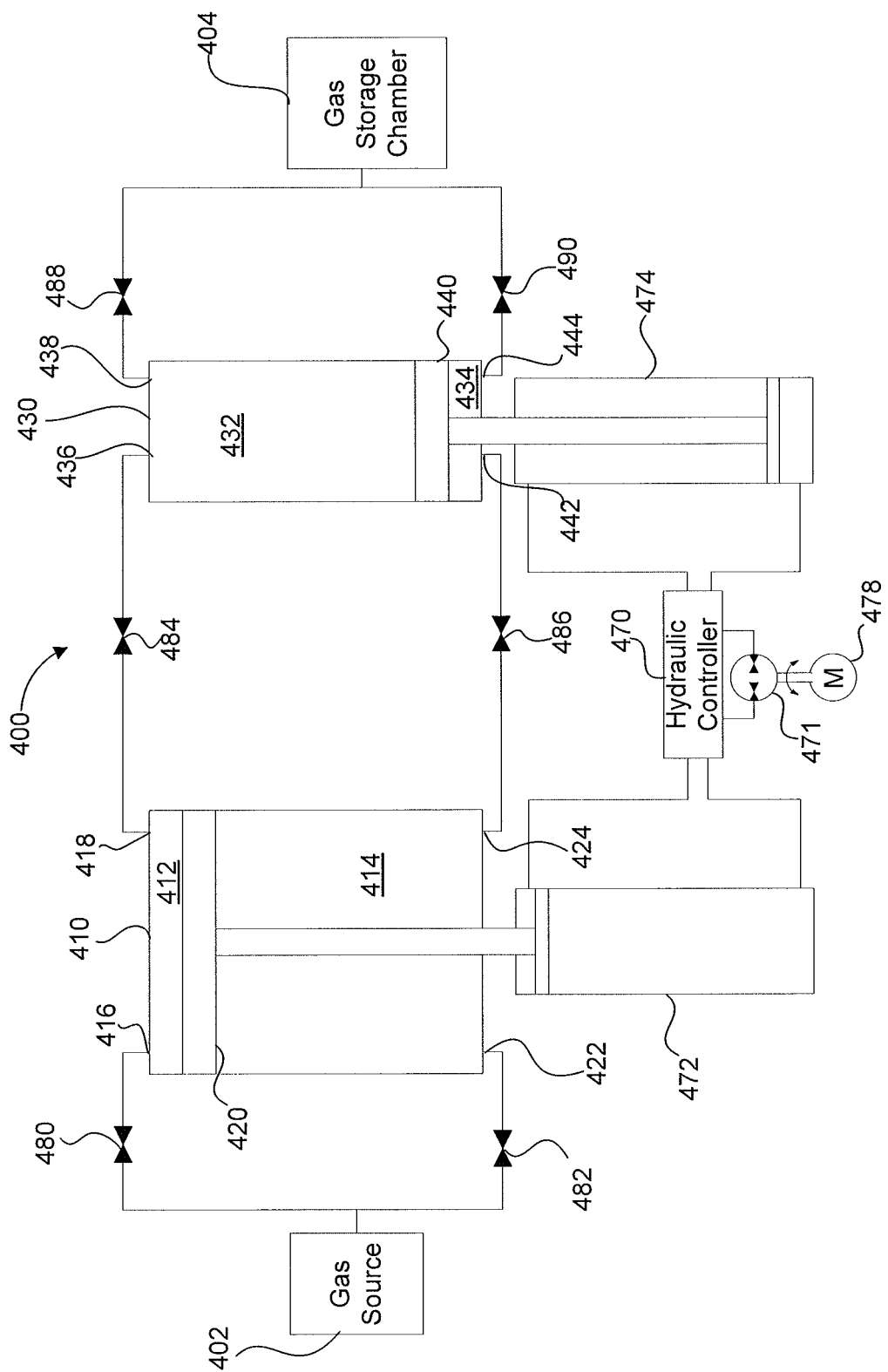
FIGS. 4A-4E are schematic illustrations of a compressed gas-based energy storage and recovery system shown in a first, second, third, fourth, and fifth configuration, respectively, illustrating a compression cycle according to an embodiment.

Referring to FIGS. 4A-4E, the compression/expansion device 400 is illustrated in first, second, third, fourth, and fifth configurations, respectively, of a compression mode or cycle. As shown in FIG. 4A, in the first configuration, each valve 480, 482, 484, 486, 488, 490 is closed. The first working piston 420 is in a first (or starting) position at or towards an end of the first pneumatic cylinder 410 such that the volume of the first pneumatic chamber 412 is less than the volume of the second pneumatic chamber 414. In some embodiments, when the first working piston 420 is in its first position, the first working piston is disposed within the first pneumatic cylinder 410 such that the volume of the first pneumatic chamber 412 is at or near zero. In other embodiments, the first pneumatic chamber 412 can have a different minimum volume.

In some embodiments, a first mass of gas at a first pressure is contained in the second pneumatic chamber 414. The second working piston 440 is in a first (or starting) position at or towards an end of the second pneumatic cylinder 430 such that the volume of the third pneumatic chamber 432 is greater than the volume of the fourth pneumatic chamber 434. In some embodiments, when the second working piston 440 is in its first position, the second working piston is disposed within the second pneumatic cylinder 430 such that the volume of the fourth pneumatic chamber 434 is at or near zero. In other embodiments, the fourth pneumatic chamber 434 is configured to have a different minimum volume. A second mass of gas at a second pressure is contained in the third pneumatic chamber 434.

Figure 4B:
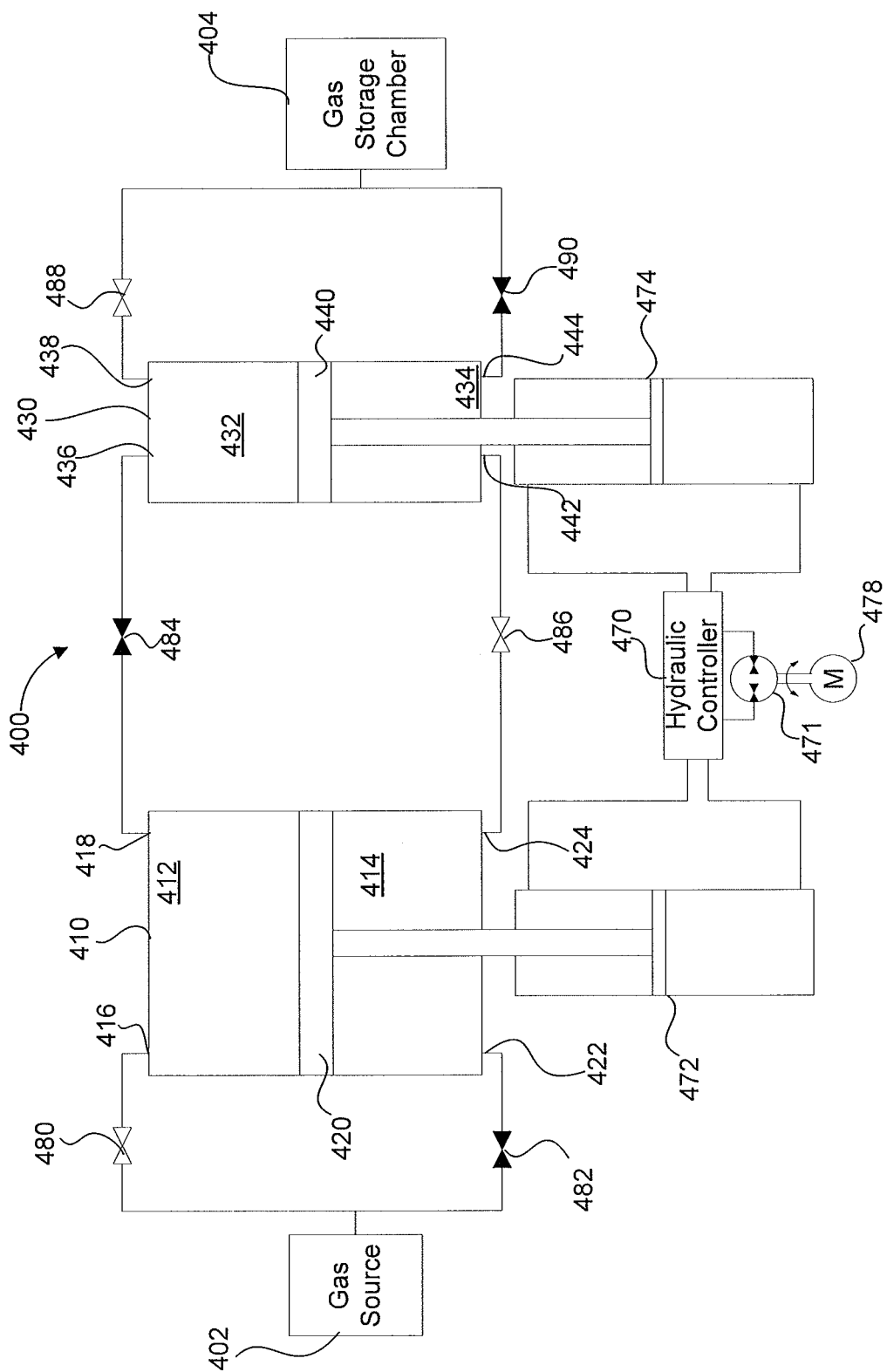

Referring to FIG. 4B, the valve 480 between the gas source 402 and the first pneumatic chamber 412 is opened. In this manner, the gas source 402 is fluidically coupled to the first pneumatic chamber such that a third mass of gas at a third pressure can flow from the gas source into the first pneumatic chamber 412 via the first fluid port 416. The first working piston 420 is moved by the first hydraulic actuator 472 in a first direction towards an opposing end of the first pneumatic cylinder 410, thereby increasing the volume of the first pneumatic chamber 412 and reducing the volume of the second pneumatic chamber 414.

In FIG. 4B, the first working piston 420 is shown in second, intermediate, position between its first position and a third position at or towards an opposing end of the first pneumatic cylinder 410. Movement of the first working piston 420 the distance from its first position to its third position completes a first stroke of the first working piston. While moving in the first direction, the first working piston 420 operates to compress the first mass of gas contained in the second pneumatic chamber 414, such that the first mass of gas is discharged from the second pneumatic chamber 414 to the fourth pneumatic chamber 434 at a fourth pressure higher than the first pressure. The valve 486 between the second pneumatic chamber 414 and the fourth pneumatic chamber 434 is opened when the first working piston 420 is moved in its first direction to permit the first mass of gas to be discharged from the second pneumatic chamber to the fourth pneumatic chamber as it is being compressed.

The second working piston 440 is moved by the second hydraulic actuator 474 in a second direction, opposite the first direction, towards an opposing end (or top) of the second pneumatic cylinder 430, thereby increasing the volume of the fourth pneumatic chamber 434 and reducing the volume of the third pneumatic chamber 432. Movement of the second working piston 440 in the second direction can occur substantially simultaneously with movement of the first working piston 420 in the first direction. The valve 486 between the second pneumatic chamber 414 and the fourth pneumatic chamber 434 can be open while the first hydraulic actuator 472 moves the first working piston 420 in the first direction and while the second hydraulic actuator 474 moves the second working piston 440 in the second direction. In this manner, the total volume of the second pneumatic chamber 430 and the fourth pneumatic chamber 434 is reduced due, in part, to the difference in size between the first pneumatic cylinder 410 and the second cylinder 430.

In FIG. 4B, the second working piston 440 is shown in a second, intermediate, position between its first position and a third position at or towards an opposing end of the second pneumatic cylinder 430. Movement of the second working piston 440 the distance from its first position to its third position completes a first stroke of the second working piston.

While moving in the second direction, the second working piston 440 operates to compress the second mass of gas contained in the third pneumatic chamber 432, such that the second mass of gas is discharged from the third pneumatic chamber 432 to the compressed gas storage chamber 404 at a fifth pressure higher than the second pressure. The valve 488 between the third pneumatic chamber 432 and the compressed gas storage chamber 404 is opened when the second working piston 440 is moving in the second direction to permit the second mass of gas to be discharged from the third pneumatic chamber to the compressed gas storage chamber as it is being compressed.

Figure 4C:
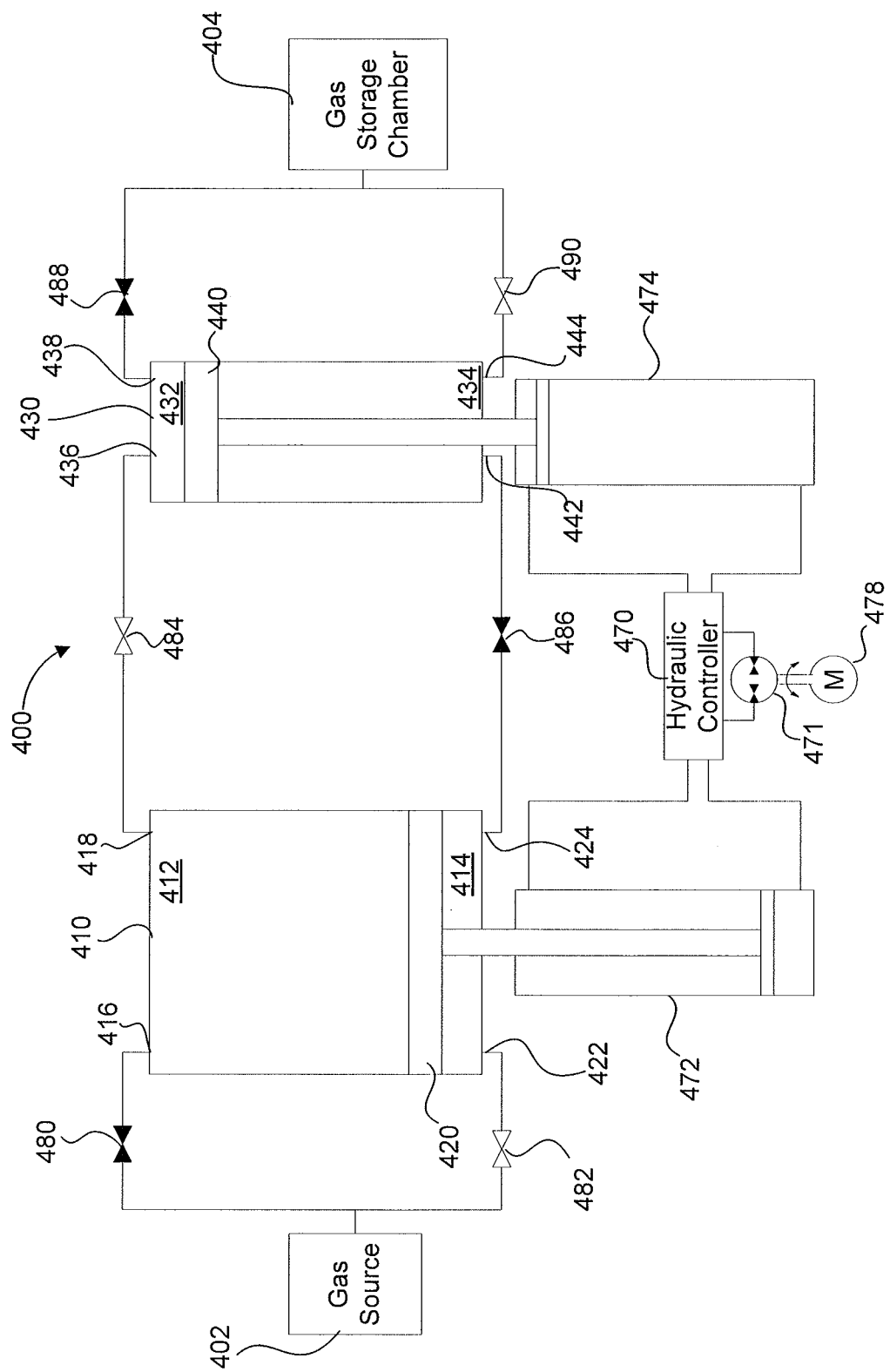

Referring to FIG. 4C, the valve 480 is closed to stop the flow of gas from the gas source 402 to the first pneumatic chamber 412. The first working piston 420 has completed its first stroke and is in its third position, at or proximate to the opposing end of the first pneumatic cylinder 410. In some embodiments, when the first working piston 420 is in its third position, the first working piston is disposed within the first pneumatic cylinder 410 such that the volume of the second pneumatic chamber 414 is at or near zero. In other embodiments, the second pneumatic chamber 414 is configured to have a different minimum volume. As such, the first working piston 420 is in position to begin its second stroke, in which the first working piston is moved the distance from its third position to its first position.

The first mass of gas has been discharged from the second pneumatic chamber 414 to the fourth pneumatic chamber 434 at the fourth pressure higher than the first pressure. The valve 486 between the second pneumatic chamber 414 and the fourth pneumatic chamber 434 is closed to prevent the first mass of gas from flowing back into the second pneumatic chamber from the fourth pneumatic chamber. The second working piston 440 has completed its first stroke and is in its third position, at or proximate to the opposing end of the second pneumatic cylinder 430. As such, the second working piston 440 is in position to begin its second stroke, in which the second working piston is moved the distance from its third position to its first position. In some embodiments, when the second working piston 440 is in its third position, the second working piston is disposed within the second pneumatic cylinder 430 such that the volume of the third pneumatic chamber 432 is at or near zero. In other embodiments, the third pneumatic chamber 432 is configured to have a different minimum volume.

The second mass of gas has been discharged from the third pneumatic chamber 432 to the compressed gas storage chamber 404 at the fifth pressure higher than the second pressure. The valve 488 between the third pneumatic chamber 432 and the compressed gas storage chamber 404 is closed to prevent the second mass of gas from flowing back into the third pneumatic chamber from the storage chamber.

As shown in FIG. 4C, the valve 482 between the gas source 402 and the second pneumatic chamber 414 is opened to permit the flow of gas from the gas source into the second pneumatic chamber via its first fluid port 422. The first working piston 420 is in its third position, which is the beginning of a second stroke of the first working piston in which the first working piston is moved in the second direction from its third position to its first position. When the first working piston 420 is in its third position, the volume of the second pneumatic chamber 414 is less than the volume of the first pneumatic chamber 412. The third mass of gas at the third pressure is contained in the first pneumatic chamber 412.

The valve 484 between the first pneumatic chamber 412 and the third pneumatic chamber 432 is opened to permit the third mass of gas to flow from the first pneumatic chamber into the third pneumatic chamber. The second working piston 440 is in its third position, which is the beginning of a second stroke of the second working piston in which the second working piston is moved in the first direction from its third position to its first position. When the second working piston 440 is in its third position, the volume of the fourth pneumatic chamber 434 is greater than the volume of the third pneumatic chamber 432. The first mass of gas at the fourth pressure is contained in the fourth pneumatic chamber 434. The valve 490 between the fourth pneumatic chamber 434 and the compressed gas storage chamber 404 is opened to permit the first mass of gas to flow from the fourth pneumatic chamber into the storage chamber.

Figure 4D:
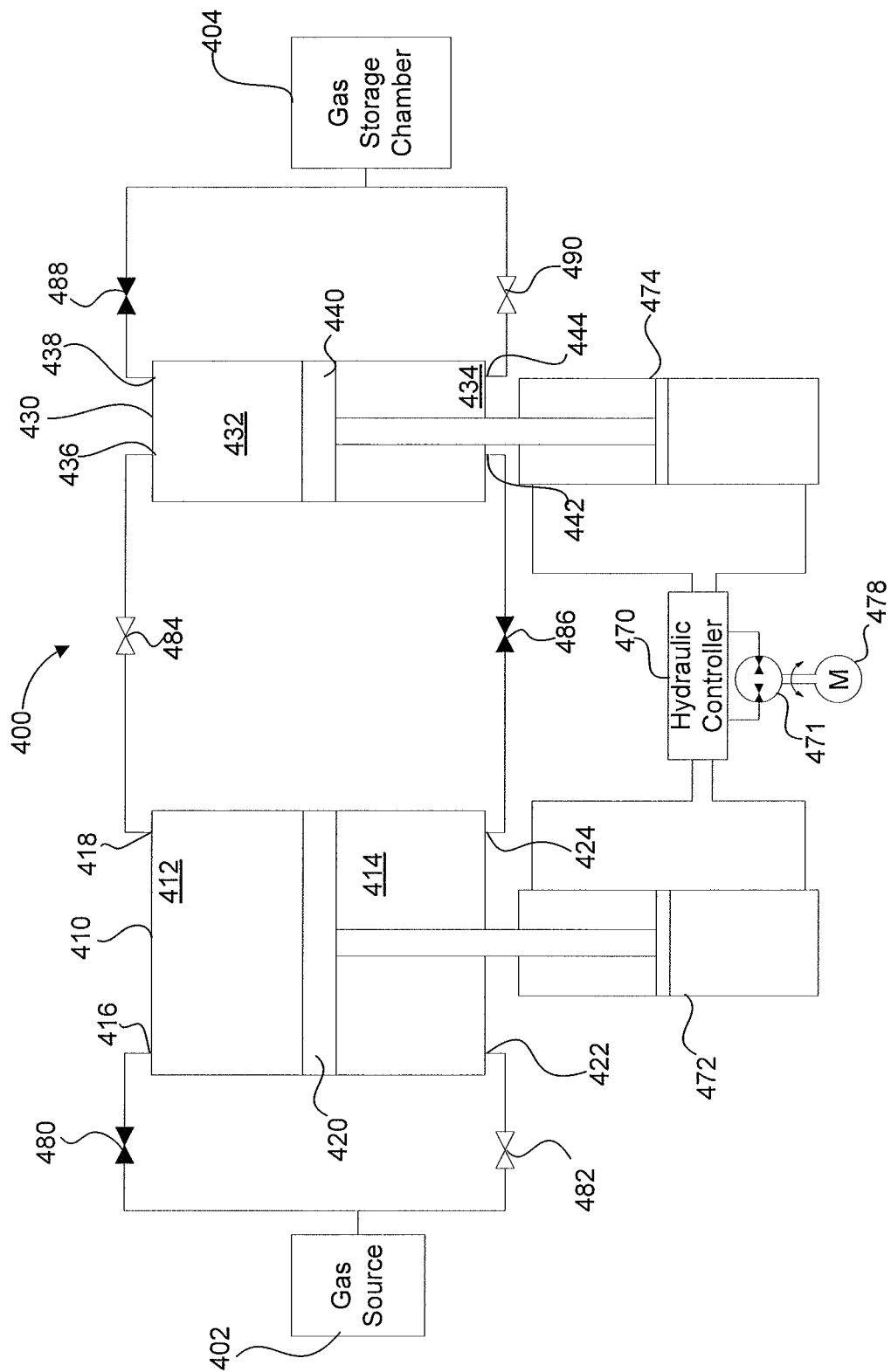

Referring to FIG. 4D, the first working piston 420 is moved by the first hydraulic actuator 472 in the second direction, thereby increasing the volume of the second pneumatic chamber 414 and reducing the volume of the first pneumatic chamber 412. In FIG. 4D, the first working piston 420 is shown in its second, or intermediate, position between its third position and its first position during its second stroke. While moving in the second direction, the first working piston 420 operates to compress the third mass of gas contained in the first pneumatic chamber 412, thereby discharging the third mass of gas from the first pneumatic chamber 412 and into the third pneumatic chamber 432 at a sixth pressure higher than the third pressure. The valve 484 between the first pneumatic chamber 412 and the third pneumatic chamber 432 can be open while the first hydraulic actuator 472 moves the first working piston 420 in the second direction and while the second hydraulic actuator 474 moves the second working piston 440 in the first direction. In this manner, the total volume of the first pneumatic chamber 412 and the third pneumatic chamber 432 is reduced due, in part, to the difference in size between the first pneumatic cylinder 410 and the second cylinder 430.

The second working piston 440 is moved by the second hydraulic actuator 474 in the first direction, thereby increasing the volume of the third pneumatic chamber 432 and reducing the volume of the fourth pneumatic chamber 434. Movement of the second working piston 440 in the first direction can occur substantially simultaneously with movement of the first working piston 420 in the second direction. In FIG. 4D, the second working piston 440 is shown in its second, or intermediate, position between its third position and its first position during its second stroke. While moving in the first direction, the second working piston 440 operates to compress the first mass of gas contained in the fourth pneumatic chamber 434, thereby discharging the first mass of gas from the fourth pneumatic chamber 434 to the compressed gas storage chamber 404 a seventh pressure higher than the fourth pressure.

Figure 4E:
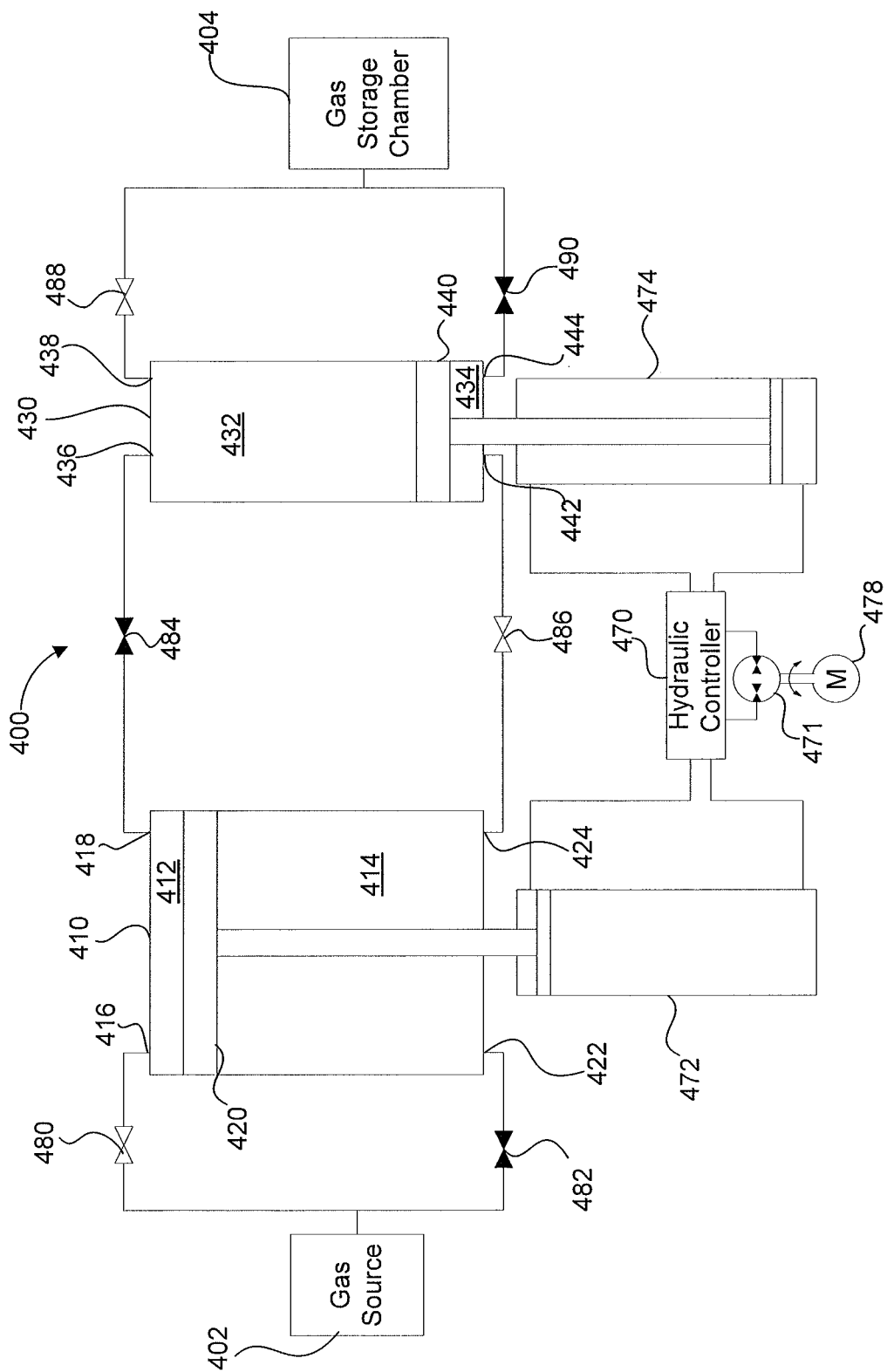

Referring to FIG. 4E, the valve 482 is closed to stop the flow of gas from the gas source 402 to the third pneumatic chamber 414. The first working piston 420 has completed its second stroke and is in its first position. The third mass of gas has been discharged from the first pneumatic chamber 412 to the third pneumatic chamber 432 at the sixth pressure higher than the second pressure, and is contained in the third pneumatic chamber. The valve 484 between the first pneumatic chamber 412 and the third pneumatic chamber 432 is closed to prevent the third mass of gas from flowing back into the first pneumatic chamber from the third pneumatic chamber. The second working piston 440 has completed its second stroke and is in its first position. The first mass of gas has been discharged from the fourth pneumatic chamber 434 to the compressed gas storage chamber 404 at the seventh pressure higher than the fourth pressure. The valve 490 between the fourth pneumatic chamber 434 and the compressed gas storage chamber 404 is closed to prevent the first mass of gas from flowing back into the fourth pneumatic chamber from the storage chamber. Valves 480, 486, 488 are opened to permit the compression cycle to be continued or repeated.

As noted above, when a volume of gas is transferred into a pneumatic chamber (e.g., first, second, third, or fourth pneumatic chambers 412, 414, 432, 434, respectively), the valve (e.g., valve 480, 482, 484, 486, respectively) associated with the inlet port (e.g., port 416, 422, 436, 442, respectively) is closed to prevent backwards flow of the gas during compression. Additionally, the valve (e.g., valve 484, 486, 488, 490, respectively) associated with the outlet port (e.g., port 418, 424, 438, 444, respectively) of the respective pneumatic chamber is opened to permit the gas to be transferred to the next downstream chamber as the gas is being compressed.

Figure 5A:
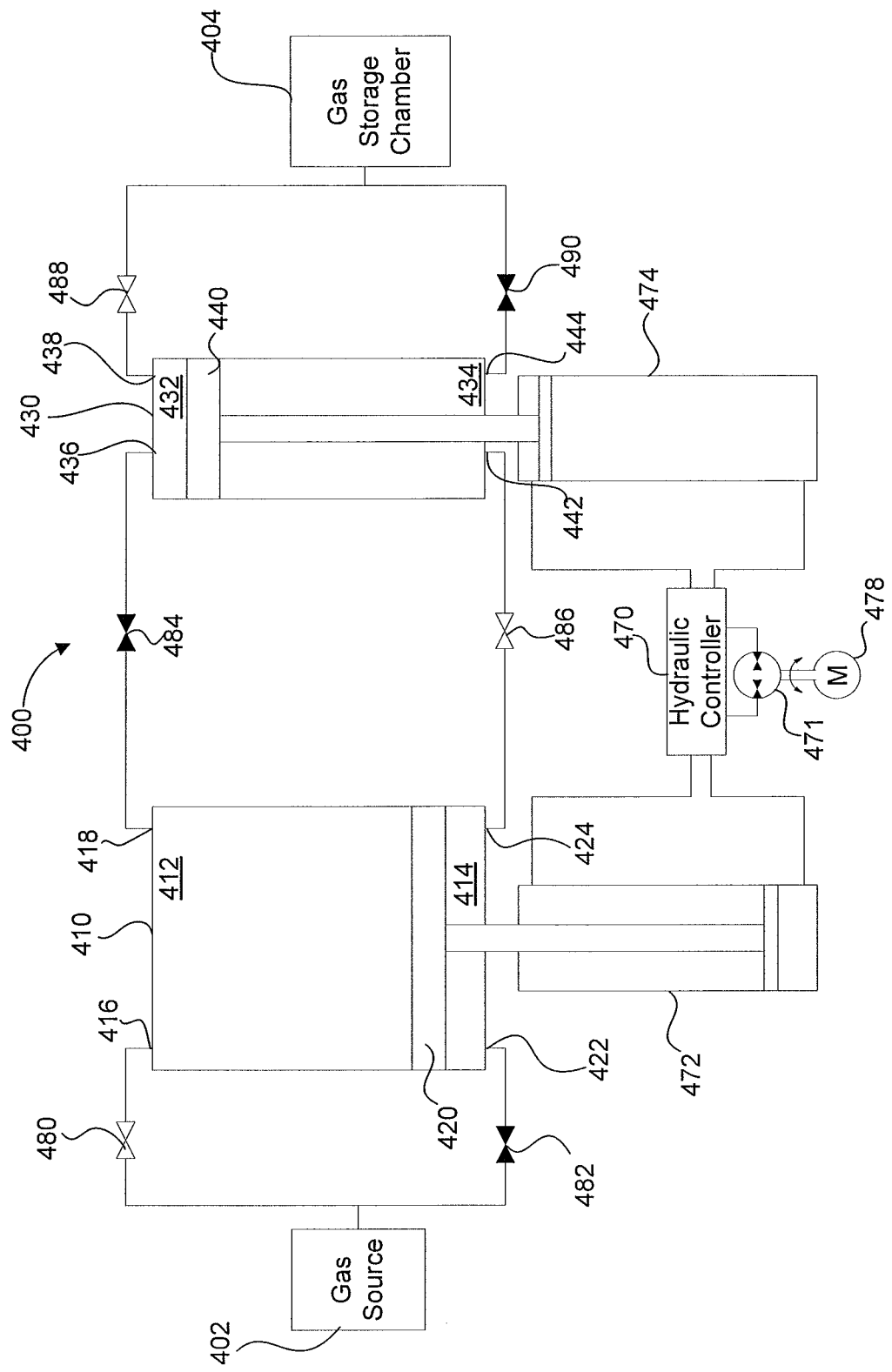
FIGS. 5A-5E are schematic illustrations of the compressed gas-based energy storage and recovery system of FIGS. 4A-4E shown in a first, second, third, fourth, and fifth configuration, respectively; illustrating an expansion cycle according to an embodiment.

Referring to FIGS. 5A-5E, the compression/expansion device 400 is illustrated in first, second, third, fourth, and fifth configurations, respectively, of an expansion mode or cycle. As shown in FIG. 5A, the second working piston 440 is in its third position within the second pneumatic cylinder 430 such that the volume of the third pneumatic chamber 432 is less than the volume of the fourth pneumatic chamber 434. The valve 488 between the compressed gas storage chamber 404 and the third pneumatic chamber 432 is opened. In this manner, the compressed gas storage chamber 404 is fluidically coupled to the third pneumatic chamber 432 such that a first mass of compressed gas at a first pressure can flow from the compressed gas storage chamber into the third pneumatic chamber via the second fluid port 438. In some embodiments, a second mass of compressed gas at a second pressure is contained in the fourth pneumatic chamber 434. The valve 486 between the fourth pneumatic chamber 434 and the second pneumatic chamber 414 is opened. In this manner, the fourth pneumatic chamber 434 is fluidically coupled to the second pneumatic chamber 412 such that the second mass of compressed gas can flow from the fourth pneumatic chamber (via its first fluid port 442) to the second pneumatic chamber (via its second fluid port 424), at the second pressure.

The first working piston 420 is in its third position within the first pneumatic cylinder 410 such that the volume of the first pneumatic chamber 412 is greater than the volume of the second pneumatic chamber 414. A third mass of compressed gas at a third pressure can be contained in the first pneumatic chamber 412. The valve 480 between the first pneumatic chamber 412 and the gas source 402 is opened, and thus the first pneumatic chamber is fluidically coupled to the gas source such that the third mass of compressed gas can flow from the first pneumatic chamber via the first fluid port 416 to the gas source at the third pressure.

Figure 5B:
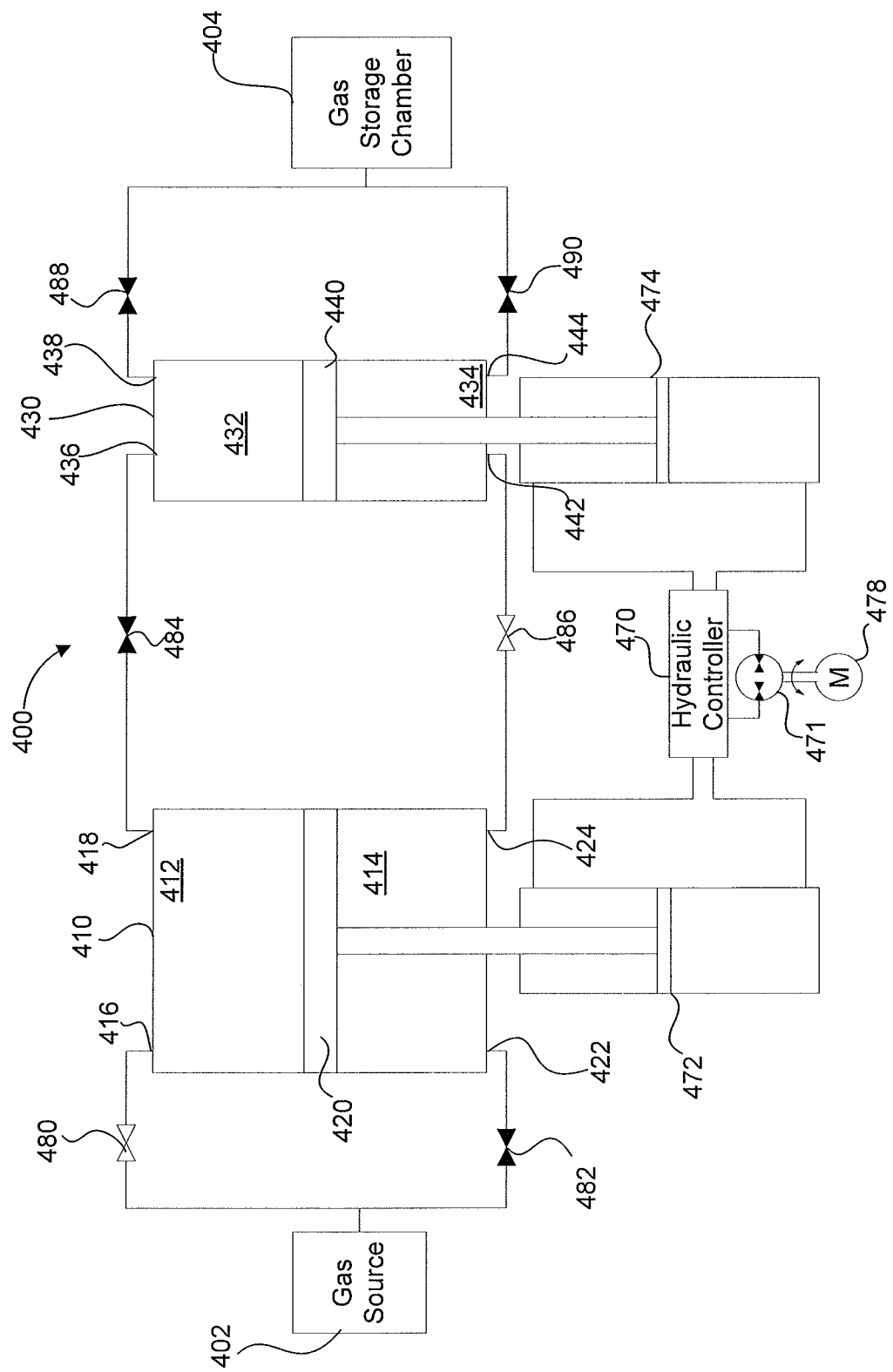

As shown in FIG. 5B, when the first mass of compressed gas is introduced into the third pneumatic chamber 432, the first mass of compressed gas is permitted to expand within the third pneumatic chamber. The valve 488 between the compressed gas storage chamber 404 and the third pneumatic chamber 432 is closed to prevent an additional amount of compressed gas from flowing into the chamber and to prevent flow of the first mass of compressed gas back into the compressed gas storage chamber 404. The expanding first mass of compressed gas exerts a force on the second working piston 440 sufficient to move the second working piston in the second direction to its second, or intermediate, position (see, e.g., FIG. 5B) and to its first position (see, e.g., FIG. 5C), thus completing a first stroke in the expansion mode. After being permitted to expand in the third pneumatic chamber 432, the first mass of compressed gas has a fourth pressure lower than the first pressure. Movement of the second working piston 440 in the second direction causes the second hydraulic actuator 474 to displace a first volume of hydraulic fluid.

Movement of the second working piston 440 in the second direction also helps transfer the second mass of compressed gas at the second pressure from the fourth pneumatic chamber 434 to the second pneumatic chamber 414. The second mass of compressed gas is permitted to expand within the second pneumatic chamber. The expanding second mass of gas exerts a force on the first working piston 420 to move the first working piston in the first direction to its second, or intermediate, position (see, e.g., FIG. 5B) and to its first position (see, e.g., FIG. 5C), thus completing a first stroke in the expansion mode. After being permitted to expand in the second pneumatic chamber 414, the second mass of compressed gas has a fifth pressure lower than the second pressure. Movement of the first working piston 420 in the first direction causes the first hydraulic actuator to displace a second volume of hydraulic fluid. Movement of the first working piston 420 in the first direction also reduces the volume of the first pneumatic chamber 412 and helps to transfer the third mass of compressed gas at the third pressure from the first pneumatic chamber to the gas source 402.

Figure 5C:
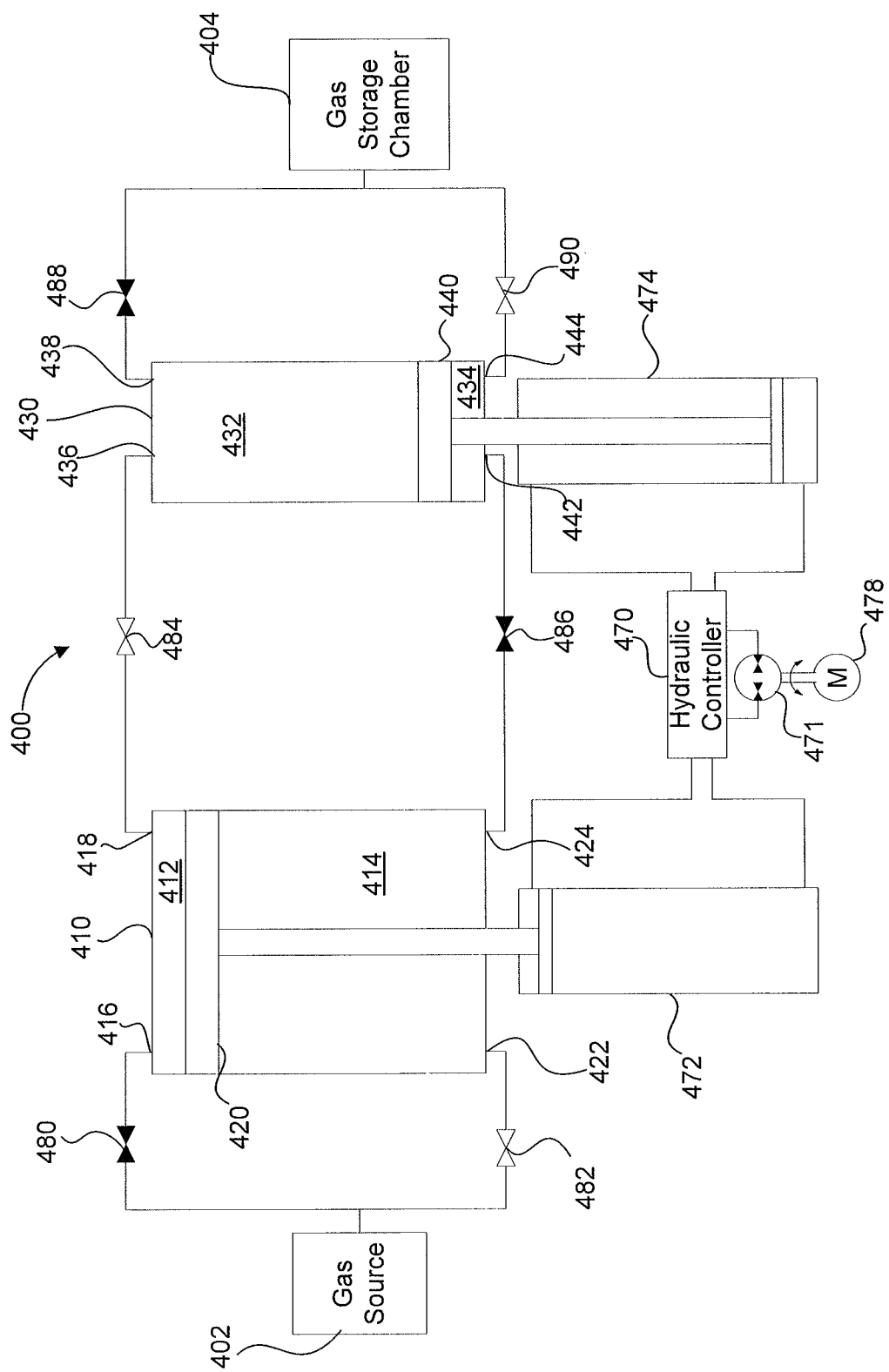

Referring to FIG. 5C, the second working piston 440, having completed its first stroke, is in its first position. The valve 490 between the compressed gas storage chamber 404 and the fourth pneumatic chamber 434 is opened. The valve 486 between the fourth pneumatic chamber 434 and the second pneumatic chamber 414 is closed and the valve 484 between the third pneumatic chamber 432 and the first pneumatic chamber 412 is opened. As such, the third pneumatic chamber 432 is fluidically coupled to the first pneumatic chamber 412 and the first mass of compressed gas can be discharged from the third pneumatic chamber to the first pneumatic chamber at the fourth pressure. The first working piston 420, having completed its first stroke, is in its first position. The valve 480 between the first pneumatic chamber 412 and the gas source 402 is closed to fluidically isolate the first pneumatic chamber from the gas source. The valve 482 between the second pneumatic chamber 414 and the gas source 402 is opened, and thus the second pneumatic chamber is fluidically coupled to the gas source such that the second mass of gas can be discharged from the second pneumatic chamber to the gas source at the fifth pressure.

Figure 5D:
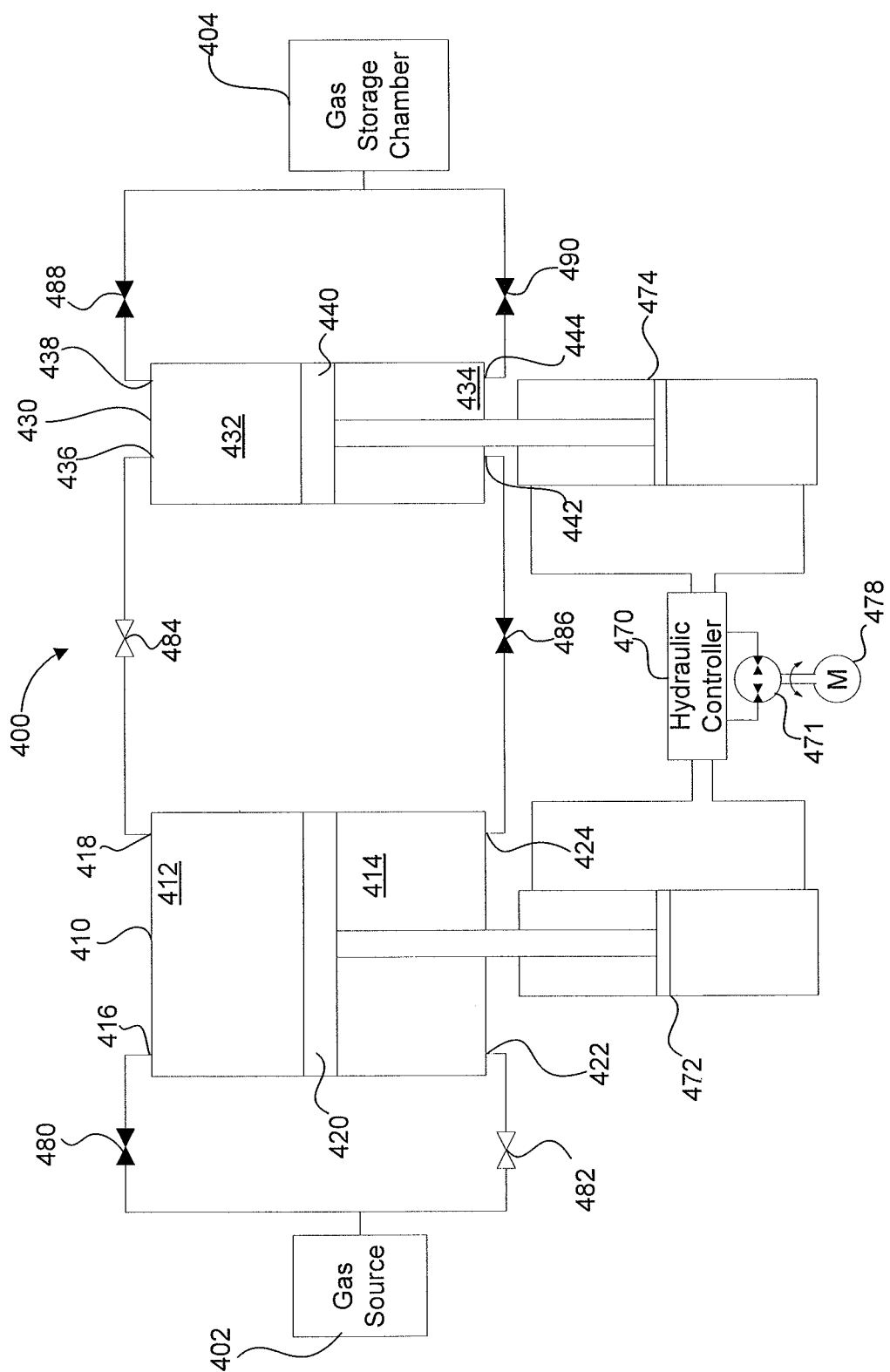

Because valve 490 is opened, the compressed gas storage chamber is fluidically coupled to the fourth pneumatic chamber such that a fourth mass of compressed gas can flow from the storage chamber to the fourth pneumatic chamber. The fourth mass of compressed gas is discharged from the compressed gas storage chamber 404 to the fourth pneumatic chamber 434 at a sixth pressure. Referring to FIG. 5D, as the fourth mass of gas enters and expands in the fourth pneumatic chamber 434, it exerts a force on the second working piston 440 thereby moving the second working piston in the first direction from its first position to its second, intermediate, position. The valve 490 is closed to prevent additional amounts of compressed gas from entering the fourth pneumatic chamber 434 from the compressed gas storage chamber 404 and to prevent the fourth mass of gas from flowing back to the storage chamber. As the second working piston is moved in its first direction, the first mass of compressed gas is discharged from the third pneumatic chamber 432 to the first pneumatic chamber 412 at the fourth pressure. The first mass of compressed gas is permitted to expand in the first pneumatic chamber 412 and thereby exerts a force on the first working piston 420 to move the first working piston in the second direction to its second, or intermediate, position. As the first working piston 420 is moved in the second direction, the second mass of gas is discharged from the second pneumatic cylinder 414 to the gas source 402 at the fifth pressure.

Figure 5E:
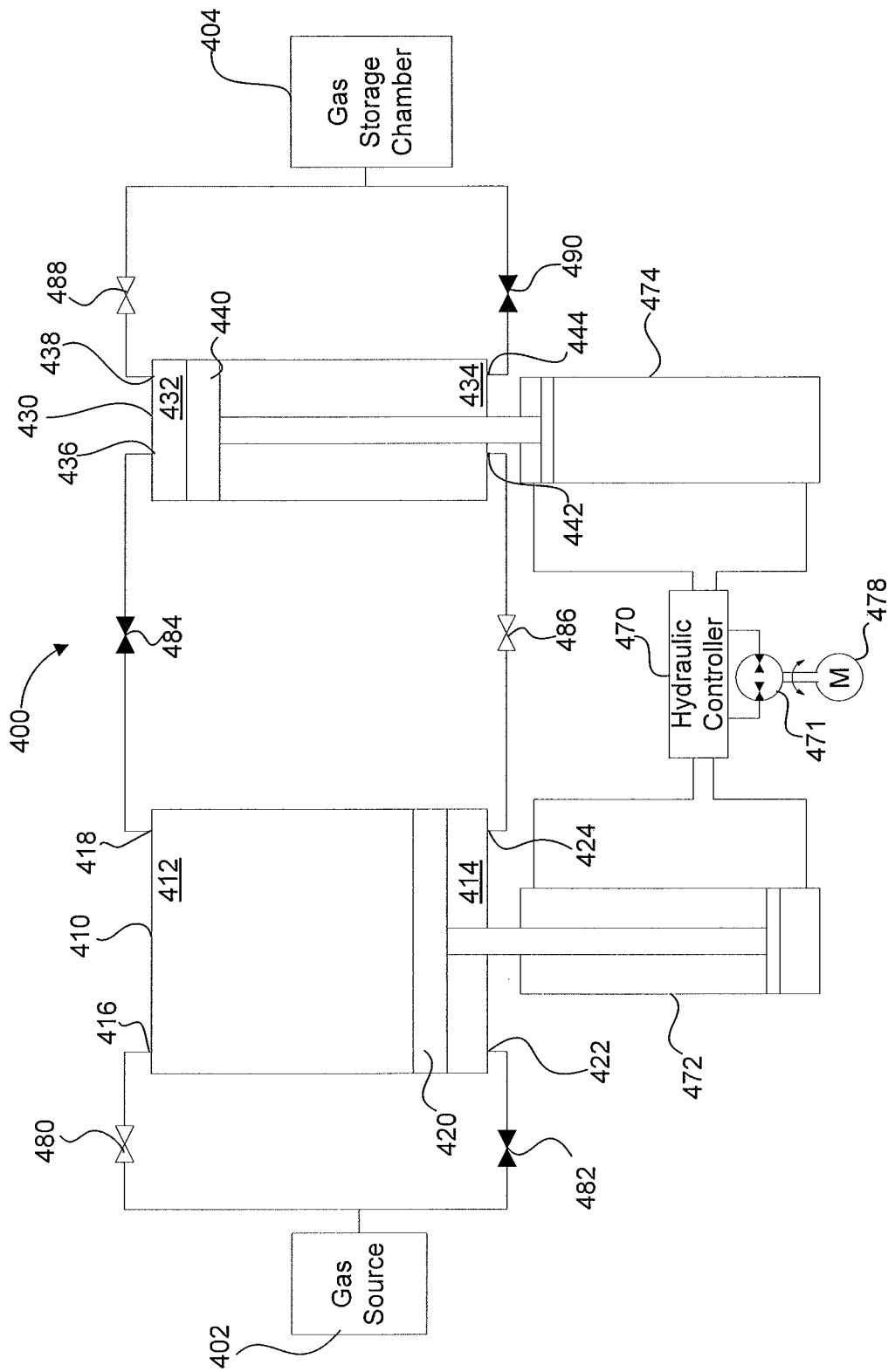

Referring to FIG. 5E, the fourth mass of gas has expanded within the fourth pneumatic chamber 434, thereby moving the second working piston 440 in the first direction to its third position, and completing a second stroke of the second working piston in the expansion mode. In completing its second stroke, the second working piston 440 moved in the first direction to increase the volume of the fourth pneumatic chamber 434 and decrease the volume of the third pneumatic chamber 432. Additionally, the second working piston 440, having moved in the first direction from its third position to its first position (i.e., its second stroke in the expansion mode), caused the second hydraulic actuator 474 to displace a third volume of hydraulic fluid.

The first mass of compressed gas has been discharged to the first pneumatic chamber 412 from the third pneumatic chamber 432 and the valve 484 therebetween is closed. The first mass of compressed gas has expanded within the first pneumatic chamber 412, and now has a seventh pressure lower than the fourth pressure. The expanding first mass of gas moved the first working piston 420 in the second direction to its first position, thereby completing a second stroke of the first working piston. In completing its second stroke, the first working piston 420 moved in the second direction to increase the volume of the first pneumatic chamber 412 and decrease the volume of the second pneumatic chamber 414. Additionally, the first working piston 420, having moved in the second direction from its first position to its third position (i.e., its second stroke), caused the first hydraulic actuator 472 to displace a fourth volume of hydraulic fluid. The second stroke of the first working piston 420 can be concurrent with, or substantially simultaneous as, the second stroke of the second working piston 440. As shown in FIG. 5E, the second mass of compressed gas has been discharged from the second pneumatic chamber 414 to the gas source 402 at the fifth pressure.

The displacement of each volume of fluid (e.g., the first, second, third, or fourth volumes of fluid) by the first and second hydraulic actuators 472, 474 generates hydraulic power. The hydraulic controller 470 controls distribution of the hydraulic power using, for example, software programmed to control a system of valves (not shown) within the hydraulic controller. The hydraulic controller 470 can control distribution of the hydraulic power to a pump/motor 471, which is configured to convert the hydraulic power into mechanical power. The pump/motor 471 is configured to transmit the mechanical power to a motor/generator 478. The motor/generator 478 is configured to convert the mechanical power to electrical power, which can then be transmitted to a power grid. The expansion mode, or cycle, can be continued or repeated as desired to convert energy stored in the form of compressed gas into electrical energy.

Figure 6:
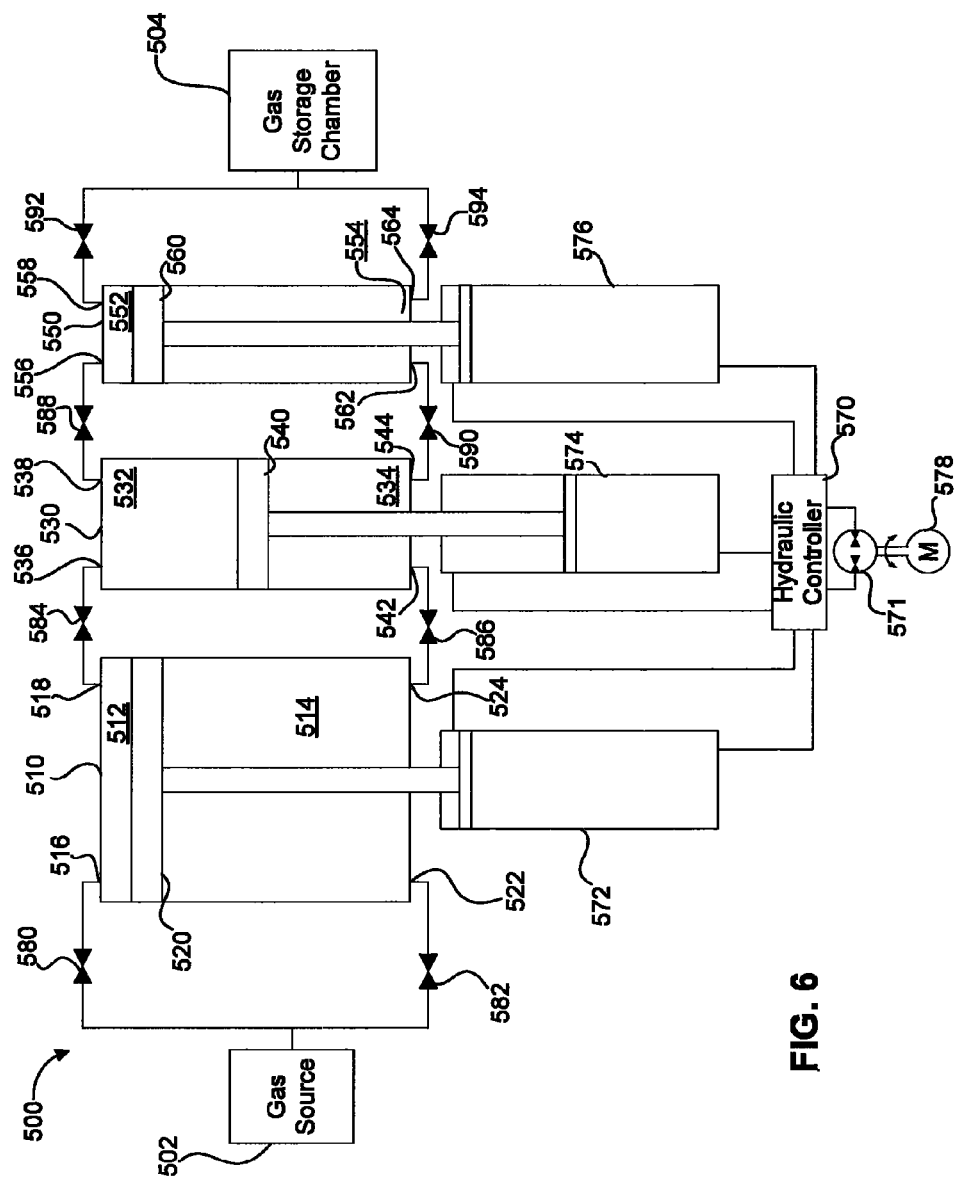
FIG. 6 is a schematic illustration of a compressed gas-based energy storage and recovery system, according to an embodiment.

Although the compression/expansion devices (e.g., devices 100, 200, 300, 400) have been illustrated and described herein as including two pneumatic cylinders (e.g., cylinders 110 and 130, 210 and 230, 310 and 330, 410 and 430, respectively), in some embodiments, a compression/expansion device includes more than two pneumatic cylinders. For example, referring to FIG. 6, a compression/expansion device 500 according to an embodiment includes three pneumatic cylinders 510, 530, 550, each operably coupled to one of three hydraulic actuators 572, 574, 576, respectively.

The device 500 includes a gas source 502 fluidically coupleable via valves 580, 582 to a first fluid port 516 of a first pneumatic chamber 512 and first fluid port 522 of a second pneumatic chamber 514, respectively, of the first pneumatic cylinder 510. A first working piston 520 is disposed in the first pneumatic cylinder 510 for reciprocating movement therein and divides the first pneumatic cylinder into the first and second pneumatic chambers 512, 514, respectively. The first working piston 420 is movably coupled to the first hydraulic actuator 572, which is fluidically coupleable to a hydraulic controller 570. The first pneumatic cylinder 510 is fluidically coupleable to the second pneumatic cylinder 530. Specifically, a second fluid port 518 of the first pneumatic chamber 512 is fluidically coupleable to a first fluid port 536 of a third pneumatic chamber of the second pneumatic cylinder 530 via a valve 584, and a second fluid port 524 of the second pneumatic cylinder 514 is fluidically coupleable to a first fluid port 542 of a fourth pneumatic chamber 534 via a valve 586. A second working piston 540 is disposed in the second pneumatic cylinder 510 for reciprocating movement therein and divides the second pneumatic cylinder into the third and fourth pneumatic chambers 532, 534, respectively. The second working piston 540 is movably coupled to the second hydraulic actuator 574, which is fluidically coupleable to the hydraulic controller 570.

The second pneumatic cylinder 530 is fluidically coupleable to the third pneumatic cylinder 550. Specifically, a second fluid port 538 of the third pneumatic chamber 532 is fluidically coupleable to a first fluid port 556 of a fifth pneumatic chamber 552 of the third pneumatic cylinder 550 via a valve 588, and a second fluid port 544 of the fourth pneumatic chamber 534 is fluidically coupleable to a first fluid port 562 of a sixth pneumatic chamber 554 of the third pneumatic cylinder via a valve 590.

The fifth pneumatic chamber 552 and sixth pneumatic chamber 554 have a collective volume that is less than a collective volume of the third pneumatic chamber 532 and the fourth pneumatic chamber 534, which is less than a collective volume of the first pneumatic chamber 512 and the second pneumatic chamber 514. Such a progressive decline in available volume for the gas to occupy facilitates compression of the gas within the device 500. In reverse, such a progressive increase in available volume for the gas to occupy facilitates expansion of the gas within the device 500.

A third working piston 560 is disposed in the third pneumatic cylinder 550 for reciprocating movement therein and divides the third pneumatic cylinder into the fifth and sixth pneumatic chambers 552, 554, respectively. The third working piston 560 is movably coupled to the third hydraulic actuator 576, which is fluidically coupleable to the hydraulic controller 570. The third working piston 560 can be configured to move in phase with the first working piston 520, which can be configured to move out of phase with the second working piston 540. The third pneumatic cylinder 550 is fluidically coupleable to a compressed gas storage chamber 504. Specifically, a second fluid port 558 of the fifth pneumatic chamber 552 is fluidically coupleable to the gas storage chamber 504 via a valve 592, and a second fluid port 564 of the sixth pneumatic chamber 554 is fluidically coupleable to the gas storage chamber via a valve 594.

The hydraulic controller 570 of compression/expansion device 500 is configured to control distribution of a hydraulic force between the first and second hydraulic actuators 572, 574 and a pump/motor 571. The pump/motor 571 is configured to convert the hydraulic force to a mechanical force or energy, and to convert mechanical energy into hydraulic force. the pump/motor is coupleable to a motor/generator 578, and can be configured to transmit a mechanical energy to and receive a mechanical energy from the motor/generator. The motor/generator 578 is configured to convert the mechanical energy into an electrical energy (e.g., for distribution to a power grid), and to convert electrical energy into mechanical energy (e.g., for storage in an energy storage and recovery system in which compression/expansion device 500 is included).

Generally, the compression/expansion device 500, and its components, can be similar in many respects to the compression/expansion devices 100, 200, 300, 400, and their components, described herein, with the addition of the third pneumatic cylinder 550 (and the third hydraulic actuator 576) for a third stage of compression and/or expansion. For example, the hydraulic controller 570 and motor/generator 578 can each be similarly operable for the conversion of energy as the hydraulic controller 470 and the motor/generator 478, respectively. In another example, the device 500 can be configured to achieve a first and second stage of gas compression utilizing the first and second pneumatic cylinders 510, 530, respectively, and the first and second hydraulic actuators 572, 574, respectively, as described above with respect to device 400 and its first and second pneumatic cylinders 410, 430, respectively, and its first and second hydraulic actuators 472, 474, respectively. The device 500 is configured to achieve the third stage of compression by discharging gas at the second stage of compression from the second pneumatic cylinder 530 into the third pneumatic cylinder 550. The third pneumatic cylinder 550 operates to achieve the third stage of compression, in a manner similar to the operation of pneumatic cylinders 410, 430 described above, and to discharge the gas at the third stage of compression from the third pneumatic cylinder to the compressed gas storage chamber 504.

Similarly, the device 500 can be configured to achieve a first and second stage of gas expansion utilizing the third and second pneumatic cylinders 550, 530, respectively, and the third and second hydraulic actuators 576, 574, respectively, as described above with respect to device 400 and its second and first pneumatic cylinders 430, 410, respectively, and its second and first hydraulic actuators 474, 472, respectively. The device 500 is configured to achieve the third stage of expansion by discharging gas at the second stage of expansion from the second pneumatic cylinder 530 into the first pneumatic cylinder 510. The first pneumatic cylinder 510 operates to achieve the third stage of expansion, in a manner similar to the operation of pneumatic cylinders 410, 430 described above, and to discharge the gas at the third stage of expansion from the first pneumatic cylinder to the gas source 502.

Figure 7:
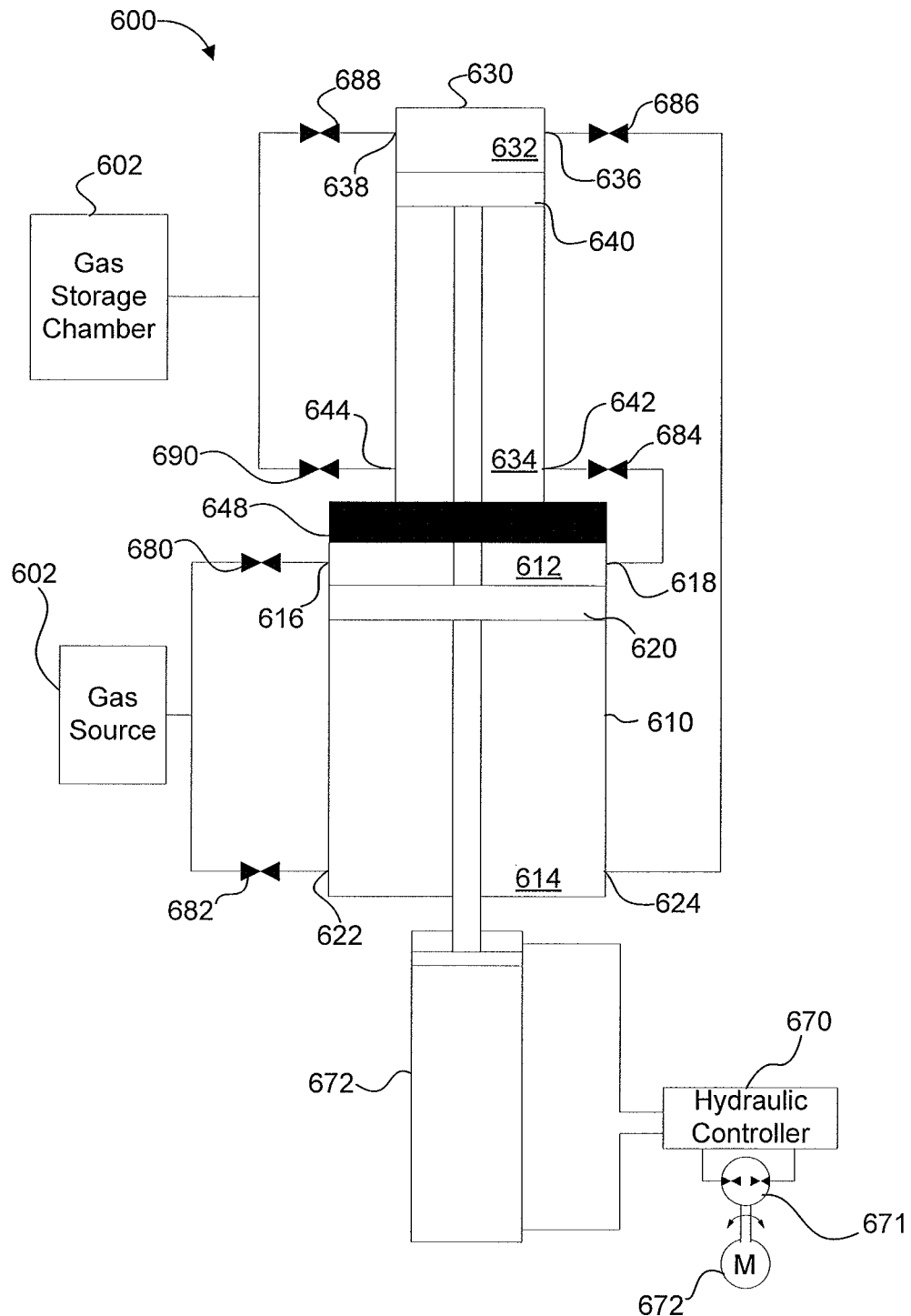
FIG. 7 is a schematic illustration of a compressed gas-based energy storage and recovery system, according to an embodiment.

Referring to FIG. 7, a compression/expansion device 600 according to another embodiment is shown. The device 600 includes a gas source, a first pneumatic cylinder 610 fluidically coupleable to the gas source, a second pneumatic cylinder 630, a compressed gas storage chamber 604 fluidically coupleable to the second pneumatic cylinder, a hydraulic actuator 672, a hydraulic controller 670, a pump/motor 671, and a motor/generator 678. The first pneumatic cylinder 610 is configured for a first stage of compression and a second stage of expansion of gas. The first pneumatic cylinder 610 has a first working piston 620 disposed therein for reciprocating movement in the first pneumatic cylinder. The first working piston 620 divides the first pneumatic cylinder 610 into a first pneumatic chamber 612 and a second pneumatic chamber 614.

The second pneumatic cylinder 630 is configured for a second stage of compression and a first stage of expansion of gas. The second pneumatic cylinder 630 has a second working piston 640 disposed therein for reciprocating movement in the second pneumatic cylinder. The second working piston 640 divides the second pneumatic cylinder 630 into a third pneumatic chamber 632 and a fourth pneumatic chamber 634. The first pneumatic cylinder 610 and second pneumatic cylinder 630 are in a stacked configuration with a connecting rod 648 disposed between, and coupled to, the first working piston 620 and the second working piston 640. The second working piston 640 is coupled to the hydraulic actuator 672. As such, the hydraulic actuator 672 is operably coupled to both the first working piston 620 and the second working piston 640. The first and second working pistons 620, 640 can be configured to move in phase (e.g., concurrently and in the same direction).

The gas source 602 is fluidically coupleable to a first fluid port 616 of the first pneumatic chamber 612 via a valve 680 and to a first fluid port 622 of the second pneumatic chamber 614 via a valve 682. For movement of the gas from the first pneumatic cylinder 610 to the second pneumatic cylinder 630, the first pneumatic chamber 612 includes a second fluid port 618 fluidically coupleable to a first fluid port 642 of the fourth pneumatic chamber 634 via a valve 684, and the second pneumatic chamber 614 includes a second fluid port 624 fluidically coupleable to a first fluid port 636 of the third pneumatic chamber 632 via a valve 686. For movement of the gas from the second pneumatic cylinder 630 to the compressed gas storage chamber 604, the third pneumatic chamber 632 includes a second fluid port 638 fluidically coupleable to the compressed gas storage chamber via a valve 688, and the fourth pneumatic chamber 634 includes a second fluid port 644 fluidically coupleable to the compressed gas storage chamber via a valve 690.

Although the respective pneumatic chambers of the first and second cylinders 610, 630 are illustrated and described herein as being fluidically coupleable for flow of the gas between the cylinders in a different manner than that described for other compression/expansion devices described herein (e.g., devices 200, 300, 400, 500), operation of the first and second cylinders 610, 630 can be very similar to that described above for the compression/expansion devices described herein. In a compression mode, the hydraulic actuator 672 is configured to concurrently move the first working piston 620 and the second working piston 640 in a first direction and/or a second direction opposite to the first direction. As such, movement of the first and second working pistons 620, 640 can be characterized as being in phase. Movement of the first working piston 620 in the first direction reduces the volume of the second pneumatic cylinder 614, and compresses any gas contained therein, while increasing the volume of the first pneumatic chamber 612. Concurrent movement of the second working piston 640 in the first direction reduces the volume of the fourth working cylinder 634, and compresses any gas contained therein, while increasing the volume of the third working cylinder 632. Gas at the first stage of compression, within the second pneumatic chamber 614, is discharged to the third pneumatic chamber 632. Gas at the second stage of compression, within the fourth pneumatic chamber 634, is discharged to the compressed gas storage chamber 604.

Movement of the first working piston 620 in the second direction reduces the volume of the first pneumatic chamber 612, and compresses gas contained therein, while increasing the volume of the second pneumatic chamber 614. Concurrent movement of the second working piston 640 in the second direction reduces the volume of the third pneumatic chamber 632, and compresses any gas contained therein, while increasing the volume of the fourth pneumatic chamber 634. Gas at the first stage of compression, within the first pneumatic chamber 612, is discharged to the fourth pneumatic chamber 634. Gas at the second stage of compression, within the third pneumatic chamber 632, is discharged to the compressed gas storage chamber 604.

In an expansion mode, a first mass of gas is transferred from the compressed gas storage chamber 604 through open valve 688 into the third pneumatic chamber 632 for a first stage of expansion. The valve 688 is closed once transfer of the first mass of gas from storage into the third pneumatic chamber 632 is complete. The first mass of gas is permitted to expand in the third pneumatic chamber 632, and thus exerts a force on the second working piston 640 to move the second working piston in the first direction. As the second working piston 640 is moved in the first direction, the valve 684 is opened to permit a second mass of gas contained in the fourth pneumatic chamber 634 to be transferred to the first pneumatic chamber 612 for a second stage of expansion. The valve 684 is closed once transfer of the second mass of from the fourth pneumatic chamber 634 to the first pneumatic chamber 612 is complete.

The second mass of gas is permitted to expand in the first pneumatic chamber 612, and thus the expanding gas exerts a force on the first working piston 620 to move the first working piston in the first direction. As the first working piston 620 is moved in the first direction, valve 682 is opened to permit a third mass of gas contained in the second pneumatic chamber 614 to be transferred to the gas source 602. The valve 682 is closed once transfer of the third mass of gas from the second pneumatic chamber 614 to the gas source 602 is complete. Movement of each of the first and second working pistons 620, 640 in the first direction causes the hydraulic actuator to displace a first volume of hydraulic fluid. In a similar manner as described above with respect to system 500, displacement of the hydraulic fluid generates a hydraulic energy, which is distributed by the hydraulic controller 670 to the pump/motor 671, where it is converted into a mechanical energy, which is conveyed to the motor/generator 678 for conversion into an electrical energy.

In the expansion mode, a fourth mass of gas is transferred from the compressed gas storage chamber 604 through open valve 690 into the fourth pneumatic chamber 634 for the first stage of expansion. The valve 690 is closed once transfer of the fourth mass of gas from storage into the fourth pneumatic chamber 634 is complete. The fourth mass of gas is permitted to expand in the fourth pneumatic chamber 634, and thus exerts a force on the second working piston 640 to move the second working piston in the second direction. As the second working piston 640 is moved in the second direction, the valve 686 is opened to permit a fifth mass of gas contained in the third pneumatic chamber 632 to be transferred to the second pneumatic chamber 614 for the second stage of expansion. The valve 686 is closed once transfer of the fifth mass of gas from the third pneumatic chamber 632 to the second pneumatic chamber 614 is complete.

The fifth mass of gas is permitted to expand in the second pneumatic chamber 612, and thus the expanding gas exerts a force on the first working piston 620 to move the first working piston in the second direction. As the first working piston 620 is moved in the second direction, the valve 680 is opened to permit a sixth mass of gas contained in the first pneumatic chamber 612 to be transferred to the gas source 602. The valve 680 is closed once transfer of the sixth mass of gas from the first pneumatic chamber 612 to the gas source 602 is complete. Movement of each of the first and second working pistons 620, 640 in the second direction causes the hydraulic actuator to displace a second volume of hydraulic fluid. In a similar manner as described above with respect to system 500, displacement of the hydraulic fluid generates a hydraulic energy, which is distributed by the hydraulic controller 670 to the pump/motor 671, where it is converted into a mechanical energy, which is conveyed to the motor/generator 678 for conversion into an electrical energy. As such, system 600 is configured for two stage compression and/or expansion with the single hydraulic actuator 672.

Although the system 600 has been illustrated and described as including the first pneumatic cylinder 610 and the second pneumatic cylinder 630, in some embodiments, a system includes pneumatic chambers differently configured. For example, in some embodiments a system for compression and/or expansion of gas can include a single vessel divided into a first pneumatic portion and a second pneumatic portion, with the first and second pneumatic portions each being divided by working pistons into two pneumatic chambers. Operation of such a system can be similar in many respects to operation of device 600.

A system for compression and/or expansion of gas can include any suitable combination of systems (e.g., system 100, 200, 300, 400, 500, 600), or portions thereof, described herein. For example, in some embodiments, such a system can include any combination of system 200 (described with reference to FIG. 2), system 500 (described with reference to FIG. 6), and system 600 (described with respect to FIG. 7). For example, a system can include two or more pneumatic cylinders in an in-line configuration and two or more pneumatic cylinders in a stacked configuration. Additionally, a system can include one, two, three, four, or more cylinders per stage of compression/expansion.

The devices and systems described herein can be implemented in a wide range of sizes and operating configurations. Said another way, the physics and fluid mechanics of the system do not depend on a particular system size. For example, systems in the power range of 2 to 8 MW are technically and economically achievable. This estimated power range results from a system design constrained to use current commercially available components, manufacturing processes, and transportation processes. Larger and/or smaller system power may be preferred if the design uses a greater fraction of custom, purpose-designed components. Moreover, system power also depends on the end-use of the system. Said another way, the size of the system may be affected by whether the system is implemented as a compressor/expander, as may be the case in a CAES application, or whether the system is implemented as an expander, as may be the case in a natural gas distribution system component, or as a compressor, as may be the case in a carbon dioxide sequestration application.

As noted above, devices and systems for the compression/expansion of gas, according to embodiments, are configured for grid scale energy storage. As such, a pneumatic cylinder (or pneumatic portion of a vessel) can be any suitable size for achieving gas compression for grid scale energy storage and/or gas expansion for grid scale energy usage. For example, in some embodiments, a pneumatic cylinder for the first stage of compression (and/or a second or later stage of expansion) can be about 6.5 meters in height and about 3.5 meters in diameter. In another example, a pneumatic cylinder for the second stage of compression (and/or a first or non-late stage of expansion) can be about 5.8 meters in height and about 1.7 meters in diameter. In some embodiments, a system includes a cylinder (or vessel) up to about 1.7 meters in diameter and 3.5 meters long, which is within current technology capabilities for precision machining (e.g., honing and chroming) an inner surface of the cylinder to produce a good seal between a working piston and the inner surface of the cylinder. In some embodiments, a system includes a cylinder (or vessel) larger than about 1.7 to 2 meters in diameter and 3.5 meters in length, which exceeds current technology capabilities for precision machining. Accordingly, such a larger cylinder can include a rolling piston seal, such as that described in U.S. Patent App. No. 61/420,505, to Ingersoll et. al., filed Dec. 7, 2010, entitled "Compressor and/or Expander Device with Rolling Piston Seal," ("the '505 application") the disclosure of which is incorporated herein by reference in its entirety.

Additionally, a compression/expansion device according to an embodiment can be configured to compress a high volume of gas into a lower volume. For example, in some embodiments, a compression/expansion device can be configured to compress about 15,000 liters to about 20,000 liters of gas at the first stage of compression. For example, the compression/expansion device can be configured to compress about 16,000 liters of gas at the first stage of compression. In some embodiments, the compression/expansion device can be configured to compress about 2,000 liters to about 2,500 liters (i.e., the inhale volume of the second-stage cylinder) of gas at the second stage of compression. For example, the compression/expansion device can be configured to compress about 2,350 liters of gas at the second stage of compression. In other words, a first pneumatic cylinder of the compression/expansion device can be configured to receive an inhale volume of about 16,000 liters of gas for the first stage of compression. The first pneumatic cylinder can be configured to compress the gas during the first stage to about 2,350 liters of gas. A second pneumatic cylinder of the compression/expansion device can be configured to receive an inhale volume of the 2,350 liters of gas from the first pneumatic cylinder. As such, the system can be characterized as being configured to achieve about a 6:1 or 7:1 compression ratio.

Devices and systems used to compress and/or expand a gas can be configured to operate in a compression mode to compress a gas up to about 250 bar. In some embodiments, a compression/expansion device is configured to compress a gas through two or three stages of compression. For example, the device can be configured to achieve a gas pressure ratio of 1:10 at a first stage of compression, and 10:250 at a second stage of compression. In another example, the device can be configured to achieve a gas pressure ratio of 1:7 at the first stage of compression, 7:90 at the second stage of compression, and, optionally, 90:250 at a third stage of compression. In yet another example, the device can be configured to compress the gas such that the pressure of the gas following the second stage of compression is 15 times greater than the pressure of the gas following the first stage of compress, thus achieving a pressure ratio of 1:15. In yet another example, the device can be configured to compress the gas such that the pressure of the gas (e.g., following the first, second, or third stage of compression) is as high as 320 or 750 bar.

Devices and systems used to compress and/or expand a gas can be configured to operate in an expansion mode to expand a gas such that the compressed gas from the compressed gas storage chamber has a pressure ratio to the expanded gas of 250:1. In some embodiments, a compression/expansion device is configured to expand a gas through two or three stages of expansion. For example, the device can be configured to achieve a gas expansion ratio of 250:10 at a first stage of expansion, and 10:1 at a second stage of expansion. In another example, the device can be configured to achieve a gas pressure ratio of 90:9 at the first stage of expansion, and 9:1 at the second stage of compression. In yet another example, the device can be configured to achieve a gas pressure ratio of 250:90 at a first stage of compression, 90:7 or 90:9 at the second stage of compression, and, optionally 7:1 or 9:1 at the third stage of compression.

Devices and systems used to compress and/or expand a gas, such as air, and/or to pressurize and/or pump a liquid, such as water, can release and/or absorb heat during, for example, a compression or expansion cycle. In some embodiments, one or more pneumatic cylinders can include a heat capacitor for transferring heat to and/or from the gas as it is being compressed/expanded, for example as described in the '679 application, incorporated by reference above. For example, a heat transfer element can be positioned within the interior of a pneumatic cylinder of a compressor/expander device to increase the amount of surface area within the pneumatic cylinder that is in direct or indirect contact with gas, which can improve heat transfer. In some embodiments, the heat transfer element can be a thermal capacitor that absorbs and holds heat released from a gas that is being compressed, and then releases the heat to a gas or a liquid at a later time. In some embodiments, the heat transfer element can be a heat transferring device that absorbs heat from a gas that is being compressed, and then facilitates the transfer of the heat outside of the pneumatic cylinder.

In another example, heat can be transferred from and/or to gas that is compressed and/or expanded by adding and/or removing liquid (e.g., water) to/from within a pneumatic cylinder. A gas/liquid or gas/heat element interface may move and/or change shape during a compression and/or expansion process in a pneumatic cylinder. This movement and/or shape change may provide a compressor/expander device with a heat transfer surface that can accommodate the changing shape of the internal areas of a pneumatic cylinder in which compression and/or expansion occurs. This movement and/or shape change may provide a compressor/expander device with a heat transfer surface that optimizes its heat transfer performance with respect to the current conditions within the pneumatic cylinder, for example, with respect to gas density, gas temperature, and/or relative temperature of gas and liquid, among others. In some embodiments, the liquid may allow the volume of gas remaining in a pneumatic cylinder after compression to be nearly eliminated or completely eliminated (i.e., zero clearance volume).

A liquid (such as water) can have a relatively high thermal capacity as compared to a gas (such as air) such that a transfer of an amount of heat energy from the gas to the liquid avoids a significant increase in the temperature of the gas, but only incurs a modest increase in the temperature of the liquid. This allows buffering of the system from substantial temperature changes. Said another way, this relationship creates a system that is resistant to substantial temperature changes. Heat that is transferred between the gas and liquid, or components of the vessel itself, may be moved from or to the pneumatic cylinder through one or more processes. In some embodiments, heat can be moved in or out of the pneumatic cylinder using mass transfer of the compression liquid itself. In other embodiments, heat can be moved in or out of the pneumatic cylinder using heat exchange methods that transfer heat in or out of the compression liquid without removing the compression liquid from the pneumatic cylinder. Such heat exchangers can be in thermal contact with the compression liquid, components of the pneumatic cylinder, a heat transfer element, or any combination thereof. Furthermore, heat exchangers may also use mass transfer to move heat in or out of the pneumatic cylinder. One type of heat exchanger that can be used to accomplish this heat transfer is a heat pipe as described in the Compressor and/or Expander Device applications and the '107 application, incorporated by reference above. Thus, the liquid within a pneumatic cylinder can be used to transfer heat from gas that is compressed or compressing (or to gas that is expanded or expanding) and can also act in combination with a heat exchanger to transfer heat to an external environment (or from an external environment). Any suitable mechanism for transferring heat out of the device during compression and/or into the device during expansion may be incorporated into the system.

In some embodiments, the hydraulic actuator includes a hydraulic ram (a component familiar to those skilled in the art of hydraulic actuation) that connects to a pneumatic piston by means of a piston rod. Piston motion results when a hydraulic pump urges hydraulic fluid into and/or out of a chamber or chambers of the hydraulic ram. Component sizes depend on the power desired for the complete system, on gas pressures, and on hydraulic fluid pressures. The gas pressures in the pneumatic portion of the system, and hydraulic fluid pressure in the hydraulic pump/motor are considered simultaneously in order to configure the relative sizes of the hydraulic ram pistons and the pneumatic cylinder pistons. In general, the ratio of the cross sectional area of the hydraulic ram piston, to the cross sectional area of the pneumatic cylinder piston must be in proportion to the ratio of the hydraulic pump/motor operating pressure, to the pneumatic cylinder operating pressure. For example, a hydraulic pump/motor may have a maximum operating pressure of 400 bar, if the maximum desired air pressure is 100 bar, then the ratio between hydraulic ram piston cross sectional area to the pneumatic cylinder piston may be no less than 100 divided by 400, and in fact should be greater than this ratio figure in order to overcome machine aspects such as component friction and the like. In addition, the ratio of hydraulic ram piston cross section area to pneumatic piston cross section area can be modified during system operation configuring a hydraulic actuation system with more than one hydraulic ram, a concept which is described in more detail below.

System operation is controlled by the hydraulic controller. The hydraulic controller coordinates: valve actuation, hydraulic pump/motor operation, hydraulic fluid direction, and compression/expansion operation. During expansion operation, the hydraulic controller determines the volume of gas to admit from the gas storage chamber into the system. By way of example, the controller may collect and evaluate system status information such as the temperatures and pressures of: the gas storage chamber, the first pneumatic cylinder, the second pneumatic cylinder, the gas source, amongst others, and determine a preferred volume of gas to admit from the gas storage chamber into the system. By way of example, the controller may admit a gas volume calculated to expand such that the gas achieves a pressure roughly equivalent to the pressure of the gas source. It is understood that it may be desirable to expand the gas to pressures that may be greater than, or less than the pressure of the gas source. The hydraulic controller may use any of several control paradigms to define overall machine operation such as: a time-based schedule for gas volume, a time-based schedule for gas pressure, a time-based schedule for gas temperature, a parametrically described position evolution, a parametrically defined pressure evolution, a parametrically defined temperature evolution, or parametrically defined power consumption/generation. Those skilled in the art of controller design will understand that the possible control algorithms are virtually unlimited.

In some embodiments, one or more hydraulic actuators of a compression/expansion device may incorporate "gear change" or "gear shift" features within a single stage of compression or expansion, or during a cycle or stroke of the actuator, to optimize the energy efficiency of the hydraulic actuation. As used herein, the terms "gear change" or "gear shift" are used to described a change in the ratio of the pressure of the hydraulic fluid in the active hydraulic actuator chambers to the pressure of the gas in the working chamber actuated by (or actuating) the hydraulic actuator, which is essentially the ratio of the pressurized surface area of the working piston(s) to the net area of the pressurized surface area(s) of the hydraulic piston(s) actuating the working piston(s). The term "gear" can refer to a state in which a hydraulic actuator has a particular piston area ratio (e.g., the ratio of the net working surface area of the hydraulic actuator to the working surface area of the working piston acting on, or being acted on by, the gas in a working chamber) at a given time period. Examples of suitable hydraulic actuators including "gear changes" or "gear shifts" are described in the '724 application, incorporated by reference above.

The compressor/expander system can be configured for use with any suitable compressed gas storage chamber, including, for example, an underground storage structure (e.g.; a pressure compensated salt cavern). Examples of suitable storage structures are described in U.S. Provisional App. No. 61/432,904 to Ingersoll et al., filed Jan. 14, 2011, entitled "Compensated Compressed Gas Storage Systems," the disclosure of which is incorporated herein by reference in its entirety. The compressor/expander system can also be used with other types of storage, including, but not limited to, tanks, underwater storage vessels, and the like.

While various embodiments of the invention have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. Additionally, certain steps may be partially completed before proceeding to subsequent steps. The embodiments have been particularly shown and described, but it will be understood that various changes in form and details may be made.

For example, although various embodiments have been described as having particular features and/or combinations of components, other embodiments are possible having any combination or sub-combination of any features and/or components from any of the embodiments described herein. For example, although the device 201 is depicted as having a single pneumatic cylinder for the first stage of compression, in some embodiments, the device can include two, three, or more pneumatic cylinders configured to operate the first stage of compression. In another example, although the devices 200, 300, 400, 500, 600 are depicted as being configured for fluid communication with a single compressed gas storage chamber, in some embodiments, the devices 200, 300, 400, 500, 600 be configured to be fluidically coupleable to any, number of compressed gas storage chambers. Similarly, although devices 200, 300, 400, 500, 600 are depicted being fluidically coupleable to a single gas source, in some embodiments, devices 200, 300, 400, 500, 600 can be fluidically coupleable to any number of gas sources. The specific configurations of the various components can also be varied. For example, the size and specific shape of the various components can be different than the embodiments shown, while still providing the functions as described herein.

What is claimed is:

1. A system for increasing the efficiency of a compressed gas-based energy storage and recovery system, the system comprising:
    a first pneumatic cylinder having a first working piston disposed therein for reciprocating movement in the first pneumatic cylinder, the first working piston dividing the first pneumatic cylinder into, and defining therewith, a first pneumatic chamber and a second pneumatic chamber,
    the first pneumatic chamber having a first fluid port and a second fluid port, the first fluid port fluidically coupleable to a gas source,
    the second pneumatic chamber having a first fluid port and a second fluid port, the first fluid port fluidically coupleable to the gas source;
    a second pneumatic cylinder having a second working piston disposed therein for reciprocating movement in the second pneumatic cylinder, the second working piston dividing the second pneumatic cylinder into, and defining therewith, a third pneumatic chamber and a fourth pneumatic chamber,
    the third pneumatic chamber having a first fluid port and a second fluid port, the first fluid port fluidically coupleable to the second fluid port of the first pneumatic chamber and the second fluid port fluidically coupleable to a compressed gas storage chamber,
    the fourth pneumatic chamber having a first fluid port and a second fluid port, the first fluid port fluidically coupleable to the second fluid port of the second pneumatic chamber and the second fluid port fluidically coupleable to the compressed gas storage chamber;
    a first hydraulic actuator coupled to the first working piston;
    a second hydraulic actuator coupled to the second working piston; and
    a hydraulic controller fluidically coupleable to the first hydraulic actuator and the second hydraulic actuator, the hydraulic controller operable in a compression mode in which the second hydraulic actuator causes gas to be discharged from the second pneumatic cylinder to the compressed gas storage chamber at a higher pressure than it enters the first pneumatic cylinder from the gas source, and an expansion mode in which gas in the first pneumatic cylinder does work on the first hydraulic actuator and is discharged from the first pneumatic cylinder to the gas source at a lower pressure than it enters the second pneumatic cylinder from the compressed gas storage chamber,
    wherein operation of the hydraulic controller in the compression mode produces a first hydraulic actuator force on the first working piston sufficient to move the first working piston: a) in a first direction such that gas contained in the first pneumatic chamber is discharged from the first pneumatic chamber into the third pneumatic chamber, and b) in a second direction, opposite the first direction, such that gas contained in the second pneumatic chamber is discharged from the second pneumatic chamber into the fourth pneumatic chamber and produces a second hydraulic actuator force on the second working piston sufficient to move the second working piston: a) in a third direction such that gas contained in the third pneumatic chamber is discharged from the third pneumatic chamber into the compressed gas storage chamber, and b) in a fourth direction, opposite the third direction, such that gas contained in the fourth pneumatic chamber is discharged from the fourth pneumatic chamber into the compressed gas storage chamber.

2. The system of claim 1, wherein operation of the hydraulic controller in the expansion mode allows the first working piston to move: a) in the first direction by compressed gas entering the second pneumatic chamber from the fourth pneumatic chamber, and b) in the second direction by compressed gas entering the first pneumatic chamber from the third pneumatic chamber.

3. The system of claim 2, wherein operation of the hydraulic controller in the expansion mode allows the second working piston to move: a) in the third direction by compressed gas entering the fourth pneumatic chamber from the compressed gas storage chamber, and b) in the fourth direction by compressed gas entering the third pneumatic chamber from the compressed gas storage chamber.

4. The system of claim 1, wherein operation of the hydraulic controller in each of the compression mode and the expansion mode causes the first working piston to move in the first direction concurrently with causing the second working piston to move in the fourth direction.

5. The system of claim 1, wherein operation of the hydraulic controller in each of the compression mode and the expansion mode causes the first working piston to move in the second direction concurrently with causing the second working piston to move in the third direction.

6. The system of claim 1, wherein the second fluid ports of the third and fourth pneumatic chambers are fluidically coupleable to the compressed gas storage chamber via a third pneumatic cylinder, further comprising:
the third pneumatic cylinder having a third working piston disposed therein for reciprocating movement in the third pneumatic cylinder, the third working piston dividing the third pneumatic cylinder into, and defining therewith, a fifth pneumatic chamber and a sixth pneumatic chamber,
the fifth pneumatic chamber having a first fluid port and a second fluid port, the first fluid port fluidically coupleable to the second fluid port of the third pneumatic chamber and the second fluid port fluidically coupleable to the compressed gas storage chamber,
the sixth pneumatic chamber having a first fluid port and a second fluid port, the first fluid port fluidically coupleable to the second fluid port of the fourth pneumatic chamber and the second fluid port fluidically coupleable to the compressed gas storage chamber.

7. The system of claim 6, further comprising:
a third hydraulic actuator coupled to the third working piston, the hydraulic controller fluidically coupleable to the third hydraulic actuator.

8. An apparatus suitable for use in a compressed gas-based energy storage and recovery system, the apparatus comprising:
a first pneumatic cylinder having a first working piston disposed therein for reciprocating movement in the first pneumatic cylinder, the first working piston dividing the first pneumatic cylinder into, and defining therewith, a first pneumatic chamber and a second pneumatic chamber;
a second pneumatic cylinder having a second working piston disposed therein for reciprocating movement in the second pneumatic cylinder, the second working piston dividing the second pneumatic cylinder into, and defining therewith, a third pneumatic chamber and a fourth pneumatic chamber;
a connecting rod disposed between, and coupled to, the first working piston and the second working piston;
a first hydraulic actuator coupled to at least one of the first working piston, the second working piston, and the connecting rod, the first hydraulic actuator operable to move the first and second working pistons in a first direction to reduce the volume of the first pneumatic chamber and the third pneumatic chamber, and to move the first and second working pistons in a second direction, opposite the first direction, to reduce the volume of the second pneumatic chamber and the fourth pneumatic chamber; and
a second hydraulic actuator coupled to at least one of the first working piston, the second working piston, and the connecting rod, the second hydraulic actuator operable to move the first and second working pistons in the first direction and the second direction.

9. The apparatus of claim 8, further comprising:
a hydraulic controller fluidically coupleable to the first and second hydraulic actuators, the hydraulic controller operable in a compression mode to produce a hydraulic actuator force on the first working piston sufficient to move the first working piston: a) in a first direction such that gas contained in the first pneumatic chamber is discharged from the first pneumatic chamber into the third pneumatic chamber, and b) in a second direction, opposite the first direction, such that gas contained in the second pneumatic chamber is discharged from the second pneumatic chamber into the fourth pneumatic chamber,
wherein operation of the hydraulic controller in the compression mode produces the hydraulic actuator force on the second working piston sufficient to move the second working piston: a) in the first direction such that gas contained in the fourth pneumatic chamber is discharged from the fourth pneumatic chamber to a compressed gas storage chamber at a higher pressure than it enters the first pneumatic cylinder from a gas source, and b) in the second direction such that gas contained in the third pneumatic chamber is discharged from the third pneumatic chamber to the compressed gas storage chamber at a higher pressure than it enters the first pneumatic cylinder from a gas source.

10. The apparatus of claim 8, further comprising:
a hydraulic controller fluidically coupleable to the first and second hydraulic actuators, the hydraulic controller operable in a compression mode in which the hydraulic actuator causes gas to be discharged from the second pneumatic cylinder to a compressed gas storage chamber at a higher pressure than it enters the first pneumatic cylinder from a gas source, and an expansion mode in which the hydraulic actuator is worked on by gas in the first pneumatic cylinder and allows gas to be discharged from the first pneumatic cylinder to the gas source at a lower pressure than it enters the second pneumatic cylinder from the compressed gas storage chamber.

11. An apparatus suitable for use in a compressed gas-based energy storage and recovery system, the apparatus comprising:
a vessel including a first pneumatic portion and a second pneumatic portion, the first pneumatic portion having a first working piston disposed therein for reciprocating movement in the first pneumatic portion, the first working piston dividing the first pneumatic portion into, and defining therewith, a first pneumatic chamber and a second pneumatic chamber, the second pneumatic portion having a second working piston disposed therein for reciprocating movement in the second pneumatic portion, the second working piston dividing the second pneumatic portion into, and defining therewith, a third pneumatic chamber and a fourth pneumatic chamber;
a connecting rod disposed between, and coupled to, the first working piston and the second working piston;
a first hydraulic actuator coupled to at least one of the first working piston, the second working piston, and the connecting rod, the first hydraulic actuator operable to move the first and second working pistons in a first direction to reduce the volume of the first pneumatic chamber and the third pneumatic chamber, and to move the first and second working pistons in a second direction, opposite the first direction, to reduce the volume of the second pneumatic chamber and the fourth pneumatic chamber, and a second hydraulic actuator coupled to at least one of the first working piston, the second working piston, and the connecting rod, the second hydraulic actuator operable to move the first and second working pistons in the first direction and the second direction.

12. The apparatus of claim 11, further comprising:

a hydraulic controller fluidically coupleable to the first and second hydraulic actuators, the hydraulic controller operable in a compression mode to produce a hydraulic actuator force on the first working piston sufficient to move the first working piston: a) in a first direction such that gas contained in the first pneumatic chamber is discharged from the first pneumatic chamber into the third pneumatic chamber, and b) in a second direction, opposite the first direction, such that gas contained in the second pneumatic chamber is discharged from the second pneumatic chamber into the fourth pneumatic chamber, wherein operation of the hydraulic controller in the compression mode produces the hydraulic actuator force on the second working piston sufficient to move the second working piston: a) in the first direction such that gas contained in the fourth pneumatic chamber is discharged from the fourth pneumatic chamber to a compressed gas storage chamber at a higher pressure than it enters the first pneumatic portion from a gas source, and b) in the second direction such that gas contained in the third pneumatic chamber is discharged from the third pneumatic chamber to the compressed gas storage chamber at a higher pressure than it enters the first pneumatic portion from a gas source.

13. The system of claim 11, further comprising:

a third pneumatic portion having a third working piston disposed therein for reciprocating movement in the third pneumatic portion, the third working piston dividing the third pneumatic portion into, and defining therewith, a fifth pneumatic chamber and a sixth pneumatic chamber; and a third hydraulic actuator coupled to the third working piston, the third hydraulic actuator operable to move the third working piston in a first direction to reduce the volume of the fifth pneumatic chamber, and to move the third working piston in a second direction, opposite the first direction, to reduce the volume of the sixth pneumatic chamber.

14. The system of claim 11, wherein a combined volume of the first and second pneumatic chambers is greater than a combined volume of the second and third pneumatic chambers.

15. The system of claim 11, wherein a change in volume of the first pneumatic chamber corresponds to a change in volume of the second pneumatic chamber.

16. The system of claim 11, wherein a change in volume of the first pneumatic chamber corresponds to a change in volume of the third pneumatic chamber.

17. The system of claim 11, wherein a maximum volume of the third pneumatic chamber is less than a maximum volume of the first pneumatic chamber.

* * * * *